(12) United States Patent
Wright et al.

(10) Patent No.: US 7,499,046 B1
(45) Date of Patent: Mar. 3, 2009

(54) SYSTEM AND METHOD FOR VISUALIZING CONNECTED TEMPORAL AND SPATIAL INFORMATION AS AN INTEGRATED VISUAL REPRESENTATION ON A USER INTERFACE

(75) Inventors: William Wright, Toronto (CA); Thomas Kapler, Toronto (CA)

(73) Assignee: Oculus Info. Inc., Toronto (CA)

( * ) Notice: Subject to any disclaimer, the term of this patent is extended or adjusted under 35 U.S.C. 154(b) by 0 days.

(21) Appl. No.: 11/078,330

(22) Filed: Mar. 14, 2005

Related U.S. Application Data

(63) Continuation-in-part of application No. 10/810,680, filed on Mar. 29, 2004.

(30) Foreign Application Priority Data

| Mar. 15, 2004 | (CA) | ................................. 2461118 |
| Nov. 16, 2004 | (CA) | ................................. 2487616 |

(51) Int. Cl.
  *G06T 1/00* (2006.01)
  *G06T 15/00* (2006.01)
(52) U.S. Cl. .................. 345/418; 345/419; 345/440
(58) Field of Classification Search .................. None
  See application file for complete search history.

(56) References Cited

U.S. PATENT DOCUMENTS

| 5,294,978 | A  | * | 3/1994 | Katayama ............... 375/240.12 |
| 6,906,709 | B1 | * | 6/2005 | Larkin et al. ................. 345/419 |
| 7,065,532 | B2 | * | 6/2006 | Elder et al. .................. 707/102 |

OTHER PUBLICATIONS

Kraak, M., "The Space-Time Cube Revisited From a Geovisualization Perspective", Proceedings of the 21st International Cartographic Conference (ICC) Durban, South Africa, Aug. 10-16, 2003.*

K. Priyantha Hewagamage, Masahito Hirakawa and Tadao Ichikawa, "Interactive Visualization of Spatiotemporal Patterns Using Spirals on a Geographical Map", Proceedings of the IEEE Symposium on Visual Languages, 1999.*

* cited by examiner

*Primary Examiner*—Ulka Chauhan
*Assistant Examiner*—Daniel F Hajnik
(74) *Attorney, Agent, or Firm*—Gowling Lafleur Henderson LLP; Grant Tisdall

(57) ABSTRACT

A system includes a visualization manager for assembling the group of data elements and for assigning a connection visual element in the visual representation between a first visual element representing a first data element of the group and a second visual element representing a second data element of the group. The system also has a spatial visualization component configured for generating a spatial domain of the visual representation to include a reference surface for providing a spatial reference frame having at least two spatial dimensions. The reference surface is for relating the first visual element to a first location of interest in the spatial reference frame and for relating the second visual element to a second location of interest in the spatial reference frame. The system also has a temporal visualization component configured for generating a temporal domain of the visual representation operatively coupled to the spatial domain, the temporal domain for providing a common temporal reference frame for the locations of interest. The temporal domain includes a first time track, such as a timeline, coupled to the first location of interest and a second time track coupled to the second location of interest, such that the first visual element is positioned on the first time track and the second visual element is positioned on the second time track. Each of the time tracks are configured for visually representing a respective temporal sequence of a plurality of the data elements at each of the locations of interest of the reference surface.

64 Claims, 26 Drawing Sheets

1. At time *t*, Entity *X* is rendered at Event1
(Location *A*)
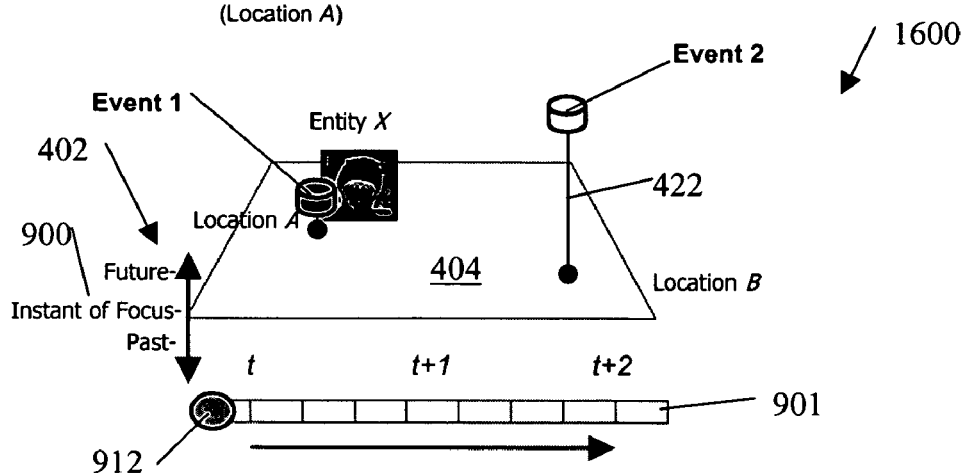
Figure 16
2. At time *t+1*, Entity *X* is shown moving between
known locations (Event1 and Event2)
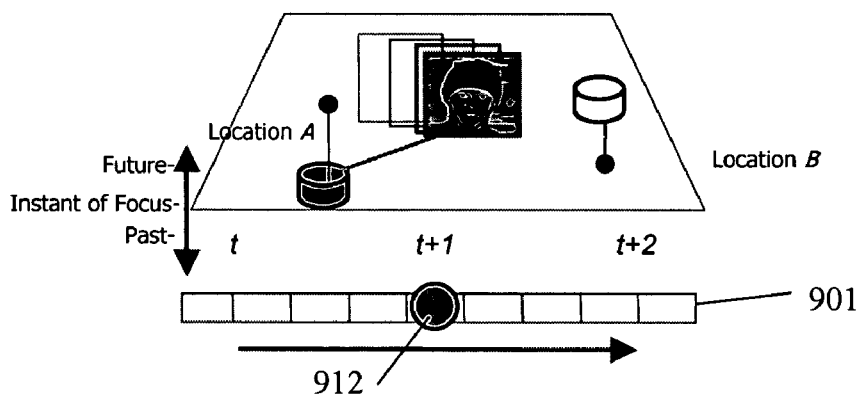
3. At time *t+2*, Entity *X* is rendered at Event2 (Location *B*)
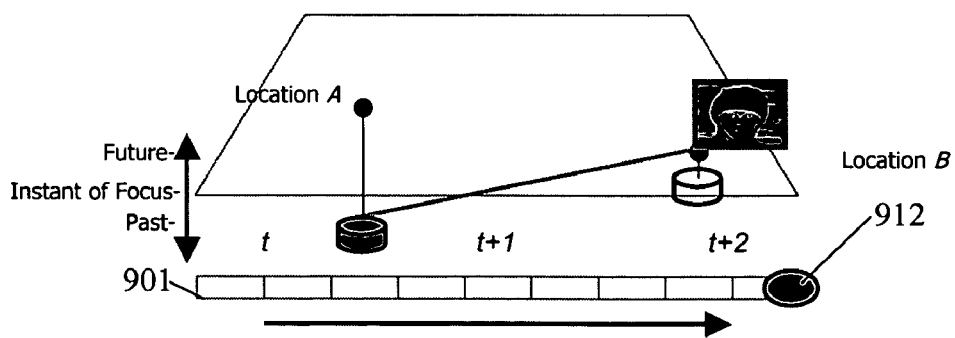

SYSTEM AND METHOD FOR VISUALIZING CONNECTED TEMPORAL AND SPATIAL INFORMATION AS AN INTEGRATED VISUAL REPRESENTATION ON A USER INTERFACE

The present application claims the benefit of Canadian Patent Application No. 2,461,118 filed Mar. 15, 2004, is a Continuation in Part application of U.S. patent application Ser. No. 10/810,680 filed Mar. 29, 2004 and herein incorporated by reference, and claims the benefit of Canadian Patent Application No. 2,487,616 filed Nov. 16, 2004.

BACKGROUND OF THE INVENTION

The present invention relates to an interactive visual presentation of multidimensional data on a user interface.

Tracking and analyzing entities and streams of events, has traditionally been the domain of investigators, whether that be national intelligence analysts, police services or military intelligence. Business users also analyze events in time and location to better understand phenomenon such as customer behavior or transportation patterns. As data about events and objects become more commonly available, analyzing and understanding of interrelated temporal and spatial information is increasingly a concern for military commanders, intelligence analysts and business analysts. Localized cultures, characters, organizations and their behaviors play an important part in planning and mission execution. In situations of asymmetric warfare and peacekeeping, tracking relatively small and seemingly unconnected events over time becomes a means for tracking enemy behavior. For business applications, tracking of production process characteristics can be a means for improving plant operations. A generalized method to capture and visualize this information over time for use by business and military applications, among others, is needed.

Many visualization techniques and products for analyzing complex event interactions only display information along a single dimension, typically one of time, geography or a network connectivity diagram. Each of these types of visualizations is common and well understood. For example a Time-focused scheduling chart such as Microsoft (MS) Project displays various project events over the single dimension of time, and a Geographic Information System (GIS) product, such as MS MapPoint, or ESRI ArcView, is good for showing events in the single dimension of locations on a map. There are also link analysis tools, such as Netmap (www.netmapanalytics.com) or Visual Analytics (www.visualanalytics.com) that display events as a network diagram, or graph, of objects and connections between objects. Some of these systems are capable of using animation to display another dimension, typically time. Time is played back, or scrolled, and the related spatial image display changes to reflect the state of information at a moment in time. However this technique relies on limited human short term memory to track and then retain temporal changes and patterns in the spatial domain. Another visualization technique called "small multiples" uses repeated frames of a condition or chart, each capturing an increment moment in time, much like looking at sequence of frames from a film laid side by side. Each image must be interpreted separately, and side-by-side comparisons made, to detect differences. This technique is expensive in terms of visual space since an image must be generated for each moment of interest, which can be problematic when trying to simultaneously display multiple images of adequate size that contain complex data content.

A technique has been developed, as described in Interactive Visualization of Spatiotemporal Patterns using Spirals on a Geographical Map—by Hewagamage et al. that uses spiral shaped ribbons as timelines to show isolated sequences of events that have occurred at discrete locations on a geographical map. This technique is limited because it uses spiral timelines exclusively to show the periodic quality of certain types of events, while does not show connectivity between the temporal and spatial information of data objects at multi-locations within the spatial domain. Further, event data objects placed on the spirals can suffer from occlusion, thereby providing for only a limited number of events and locations viewable with the spiral timelines.

It is an object of the present invention to provide a system and method for the integrated, interactive visual representation of a plurality of events and objects with spatial and temporal properties to obviate or mitigate at least some of the above-mentioned disadvantages.

SUMMARY OF THE INVENTION

Tracking and analyzing entities and streams of events, has traditionally been the domain of investigators, whether that be national intelligence analysts, police services or military intelligence. Business users also analyze events in time and location to better understand phenomenon such as customer behavior or transportation patterns. As data about events and objects become more commonly available, analyzing and understanding of interrelated temporal and spatial information is increasingly a concern for military commanders, intelligence analysts and business analysts. Contrary to present analysis tools, a system and method is provided for creating a multidimensional visual representation of a group of data elements having integrated temporal and spatial properties. The data elements are included in the visual representation as corresponding visual elements, such that the data elements of the group linked by at least one association. The system includes a visualization manager for assembling the group of data elements using the at least one association and for assigning a connection visual element in the visual representation between a first visual element representing a first data element of the group and a second visual element representing a second data element of the group. The system also has a spatial visualization component, such as a sprite, configured for generating a spatial domain of the visual representation to include a reference surface for providing a spatial reference frame having at least two spatial dimensions. The reference surface is for relating the first visual element to a first location of interest in the spatial reference frame and for relating the second visual element to a second location of interest in the spatial reference frame. The system also has a temporal visualization component, such as a sprite, configured for generating a temporal domain of the visual representation operatively coupled to the spatial domain, the temporal domain for providing a common temporal reference frame for the locations of interest. The temporal domain includes a first time track, such as a timeline, coupled to the first location of interest and a second time track coupled to the second location of interest, such that the first visual element is positioned on the first time track and the second visual element is positioned on the second time track. Each of the time tracks configured for visually representing a respective temporal sequence of a plurality of the data elements at each of the locations of interest of the reference surface. In implementation of the method, the connection visual element represents a distributed association in at least one of the domains between the first visual element and the second visual element such that the visual representation is displayed on a user interface for subsequent interaction with user events, including animation of the visual elements to help in the analysis of the data contained in the visual representation.

According to the present invention there is provided a method for creating a multidimensional visual representation of a group of data elements having integrated temporal and spatial properties, the data elements being included in the visual representation as corresponding visual elements, the data elements of the group linked by at least one association, the method comprising the steps of: assembling the group of data elements using the at least one association; generating a spatial domain of the visual representation to include a reference surface for providing a spatial reference frame having at least two spatial dimensions, the reference surface for relating a first visual element representing a first data element of the group to a first location of interest in the spatial reference frame and relating a second visual element representing a second data element of the group to a second location of interest in the spatial reference frame; generating a temporal domain of the visual representation operatively coupled to the spatial domain, the temporal domain for providing a common temporal reference frame for the locations of interest, the temporal domain including a first time track coupled to the first location of interest and a second time track coupled to the second location of interest, the first visual element positioned on the first time track and the second visual element positioned on the second time track, each of the time tracks configured for visually representing a respective temporal sequence of a plurality of the data elements at each of the locations of interest of the reference surface; and assigning a connection visual element in the visual representation between the first visual element and the second visual element, the connection visual element for representing a distributed association in at least one of the domains between the first visual element and the second visual element; wherein the visual representation is displayed on a user interface for subsequent interaction with user events.

According to a further aspect of the present invention there is provided a system for creating a multidimensional visual representation of a group of data elements having integrated temporal and spatial properties, the data elements being included in the visual representation as corresponding visual elements, the data elements of the group linked by at least one association, the system comprising: a visualization manager for assembling the group of data elements using the at least one association and for assigning a connection visual element in the visual representation between a first visual element representing a first data element of the group and a second visual element representing a second data element of the group; a spatial visualization component configured for generating a spatial domain of the visual representation to include a reference surface for providing a spatial reference frame having at least two spatial dimensions, the reference surface for relating the first visual element to a first location of interest in the spatial reference frame and relating the second visual element to a second location of interest in the spatial reference frame; and a temporal visualization component configured for generating a temporal domain of the visual representation operatively coupled to the spatial domain, the temporal domain for providing a common temporal reference frame for the locations of interest, the temporal domain including a first time track coupled to the first location of interest and a second time track coupled to the second location of interest, the first visual element positioned on the first time track and the second visual element positioned on the second time track, each of the time tracks configured for visually representing a respective temporal sequence of a plurality of the data elements at each of the locations of interest of the reference surface; and wherein the connection visual element represents a distributed association in at least one of the domains between the first visual element and the second visual element such that the visual representation is displayed on a user interface for subsequent interaction with user events.

According to a still further aspect of the present invention there is provided a computer program product for creating a multidimensional visual representation of a group of data elements having integrated temporal and spatial properties, the data elements being included in the visual representation as corresponding visual elements, the data elements of the group linked by at least one association, the computer program product comprising: a computer readable medium; a visualization module stored on the computer readable medium for assembling the group of data elements using the at least one association and for assigning a connection visual element in the visual representation between a first visual element representing a first data element of the group and a second visual element representing a second data element of the group; a spatial visualization module stored on the computer readable medium for generating a spatial domain of the visual representation to include a reference surface for providing a spatial reference frame having at least two spatial dimensions, the reference surface for relating the first visual element to a first location of interest in the spatial reference frame and relating the second visual element to a second location of interest in the spatial reference frame; and a temporal visualization module stored on the computer readable medium for generating a temporal domain of the visual representation operatively coupled to the spatial domain, the temporal domain for providing a common temporal reference frame for the locations of interest, the temporal domain including a first time track coupled to the first location of interest and a second time track coupled to the second location of interest, the first visual element positioned on the first time track and the second visual element positioned on the second time track, each of the time tracks configured for visually representing a respective temporal sequence of a plurality of the data elements at each of the locations of interest of the reference surface; wherein the connection visual element represents a distributed association in at least one of the domains between the first visual element and the second visual element such that the visual representation is displayed on a user interface for subsequent interaction with user events.

BRIEF DESCRIPTION OF THE DRAWINGS

A better understanding of these and other embodiments of the present invention can be obtained with reference to the following drawings and detailed description of the preferred embodiments, in which:

FIG. 16 shows a further example operation of the tool of FIG. 3;

It is noted that similar references are used in different figures to denote similar components.

DETAILED DESCRIPTION OF THE PREFERRED EMBODIMENT

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the Java computer programming language (or other computer programming languages in conjunction with C/C++). Any limitations presented would be a result of a particular type of operating system, computer programming language, or data processing system and would not be a limitation of the present invention.

Visualization Environment

Figure 1:
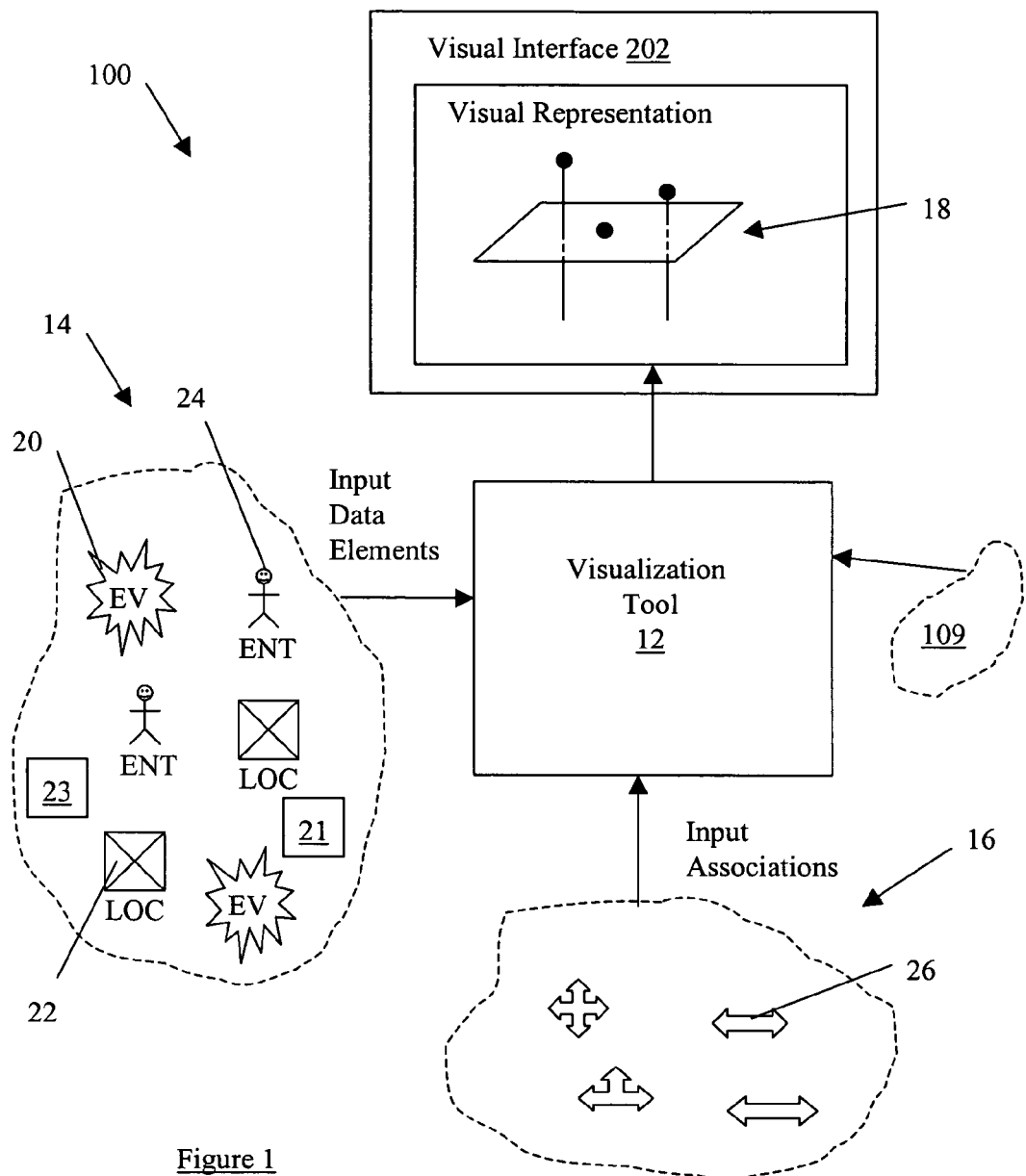
FIG. 1 is a block diagram of a data processing system for a visualization tool.
Figure 20:
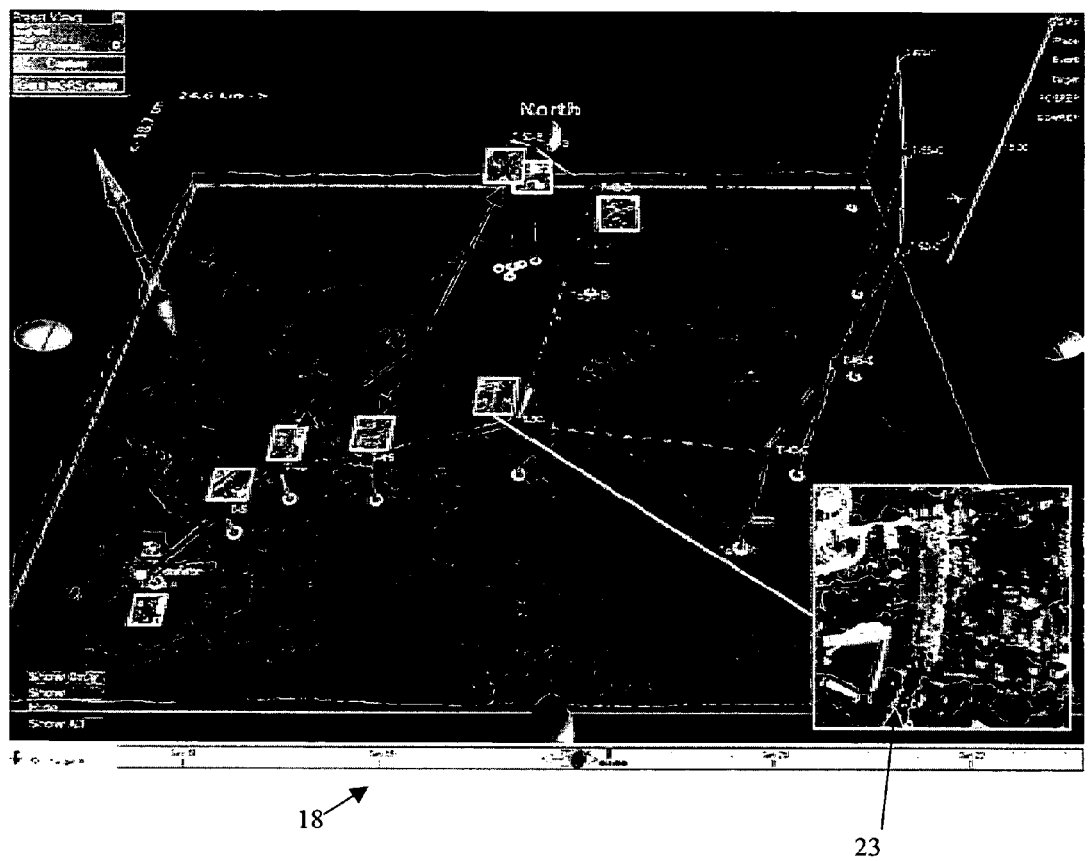
FIG. 20 is a further embodiment of FIG. 18 showing imagery.

Referring to FIG. 1, a visualization data processing system 100 includes a visualization tool 12 for processing a collection of data objects 14 as input data elements to a user interface 202. The data objects 14 are combined with a respective set of associations 16 by the tool 12 to generate an interactive visual representation 18 on the visual interface (VI) 202. The data objects 14 include event objects 20, location objects 22, images 23 (see FIG. 20) and entity objects 24, as further described below. The set of associations 16 include individual associations 26 that associate together various subsets of the objects 20, 22, 23, 24, as further described below. Management of the data objects 14 and set of associations 16 are driven by user events 109 of a user (not shown) via the user interface 108 (see FIG. 2) during interaction with the visual representation 18. The representation 18 shows connectivity between temporal and spatial information of data objects 14 at multi-locations within the spatial domain 400 (see FIG. 4).

Data Processing System

Figure 2:
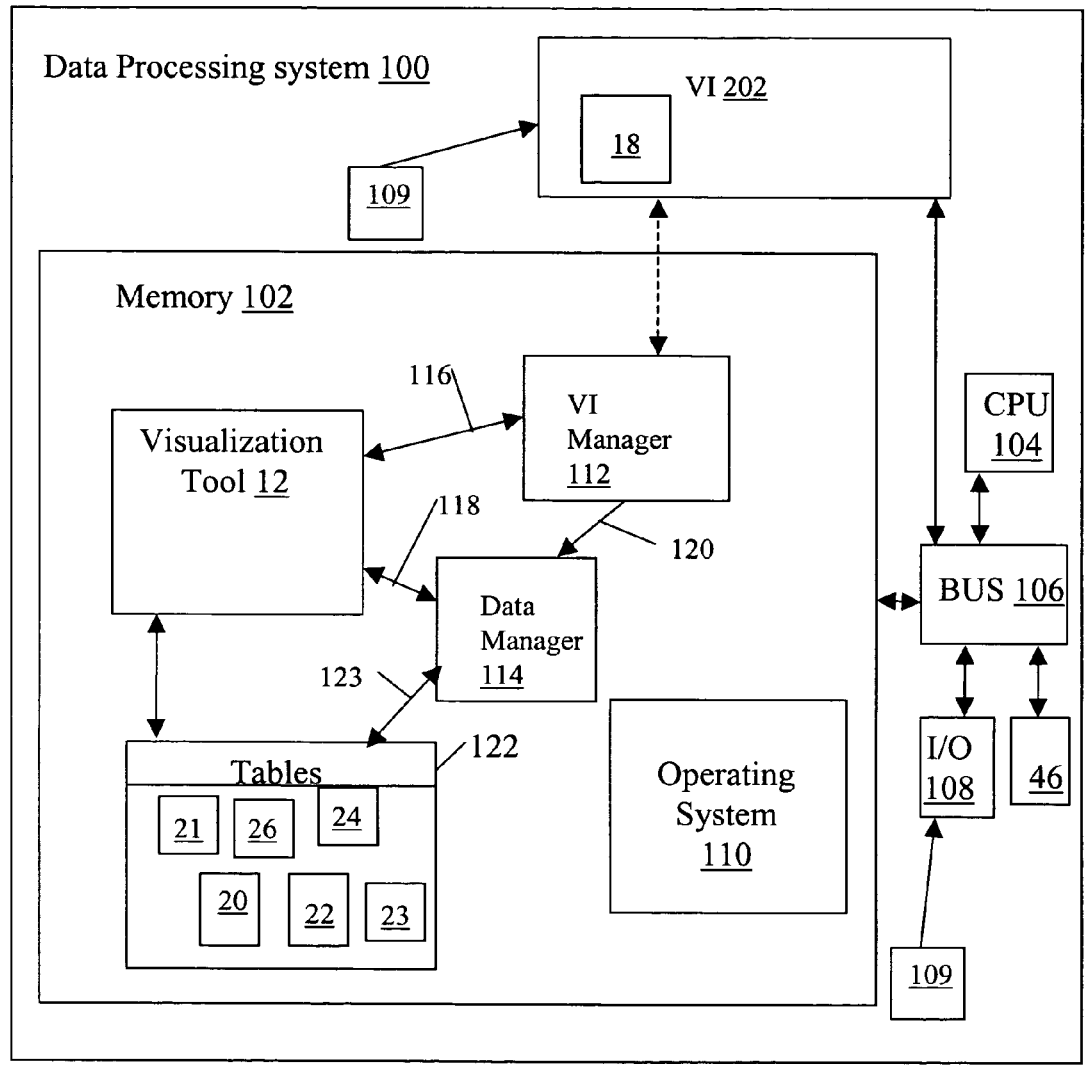
FIG. 2 shows further details of the data processing system of FIG. 1.

Referring to FIG. 2, the data processing system 100 has a user interface 108 for interacting with the tool 12, the user interface 108 being connected to a memory 102 via a BUS 106. The interface 108 is coupled to a processor 104 via the BUS 106, to interact with user events 109 to monitor or otherwise instruct the operation of the tool 12 via an operating system 110. The user interface 108 can include one or more user input devices such as but not limited to a QWERTY keyboard, a keypad, a trackwheel, a stylus, a mouse, and a microphone. The visual interface 202 is considered the user output device, such as but not limited to a computer screen display. If the screen is touch sensitive, then the display can also be used as the user input device as controlled by the processor 104. Further, it is recognized that the data processing system 100 can include a computer readable storage medium 46 coupled to the processor 104 for providing instructions to the processor 104 and/or the tool 12. The computer readable medium 46 can include hardware and/or software such as, by way of example only, magnetic disks, magnetic tape, optically readable medium such as CD/DVD ROMS, and memory cards. In each case, the computer readable medium 46 may take the form of a small disk, floppy diskette, cassette, hard disk drive, solid-state memory card, or RAM provided in the memory 102. It should be noted that the above listed example computer readable mediums 46 can be used either alone or in combination.

Referring again to FIG. 2, the tool 12 interacts via link 116 with a VI manager 112 (also known as a visualization renderer) of the system 100 for presenting the visual representation 18 on the visual interface 202. The tool 12 also interacts via link 118 with a data manager 114 of the system 100 to coordinate management of the data objects 14 and association set 16 from data files or tables 122 of the memory 102. It is recognized that the objects 14 and association set 16 could be stored in the same or separate tables 122, as desired. The data manager 114 can receive requests for storing, retrieving, amending, or creating the objects 14 and association set 16 via the tool 12 and/or directly via link 120 from the VI manager 112, as driven by the user events 109 and/or independent operation of the tool 12. The data manager 114 manages the objects 14 and association set 16 via link 123 with the tables 122. Accordingly, the tool 12 and managers 112, 114 coordinate the processing of data objects 14, association set 16 and user events 109 with respect to the content of the screen representation 18 displayed in the visual interface 202.

Tool Information Model

Referring to FIG. 1, a tool information model is composed of the four basic data elements (objects 20, 22, 23, 24 and associations 26) that can have corresponding display elements in the visual representation 18. The four elements are used by the tool 12 to describe interconnected activities and information in time and space as the integrated visual representation 18, as further described below.

Event Data Objects 20

Events are data objects 20 that represent any action that can be described. The following are examples of events;

Bill was at Toms house at 3 pm,
Tom phoned Bill on Thursday,
A tree fell in the forest at 4:13 am, Jun. 3, 1993 and
Tom will move to Spain in the summer of 2004.

The Event is related to a location and a time at which the action took place, as well as several data properties and display properties including such as but not limited to; a short text label, description, location, start-time, end-time, general event type, icon reference, visual layer settings, priority, status, user comment, certainty value, source of information, and default+user-set color. The event data object 20 can also reference files such as images or word documents.

Locations and times may be described with varying precision. For example, event times can be described as "during the week of January 5$^{th}$" or "in the month of September". Locations can be described as "Spain" or as "New York" or as a specific latitude and longitude.

Entity Data Objects 24

Entities are data objects 24 that represent any thing related to or involved in an event, including such as but not limited to; people, objects, organizations, equipment, businesses, observers, affiliations etc. Data included as part of the Entity data object 24 can be short text label, description, general entity type, icon reference, visual layer settings, priority, status, user comment, certainty value, source of information, and default+user-set color. The entity data can also reference files such as images or word documents. It is recognized in reference to FIGS. 6 and 7 that the term Entities includes "People", as well as equipment (e.g. vehicles), an entire organization (e.g. corporate entity), currency, and any other object that can be tracked for movement in the spatial domain 400. It is also recognized that the entities 24 could be stationary objects such as but not limited to buildings. Further, entities can be phone numbers and web sites. To be explicit, the entities 24 as given above by example only can be regarded as Actors Location Data Objects 22

Locations are data objects 22 that represent a place within a spatial context/domain, such as a geospatial map, a node in a diagram such as a flowchart, or even a conceptual place such as "Shang-ri-la" or other "locations" that cannot be placed at a specific physical location on a map or other spatial domain. Each Location data object 22 can store such as but not limited to; position coordinates, a label, description, color information, precision information, location type, non-geospatial flag and user comments.

Associations

Event 20, Location 22 and Entity 24 are combined into groups or subsets of the data objects 14 in the memory 102 (see FIG. 2) using associations 26 to describe real-world occurrences. The association is defined as an information object that describes a pairing between 2 data objects 14. For example, in order to show that a particular entity was present when an event occurred, the corresponding association 26 is created to represent that Entity X "was present at" Event A. For example, associations 26 can include such as but not limited to; describing a communication connection between two entities 24, describing a physical movement connection between two locations of an entity 24, and a relationship connection between a pair of entities 24 (e.g. family related and/or organizational related). It is recognised that the associations 26 can describe direct and indirect connections. Other examples can include phone numbers and web sites.

A variation of the association type 26 can be used to define a subclass of the groups 27 to represent user hypotheses. In other words, groups 27 can be created to represent a guess or hypothesis that an event occurred, that it occurred at a certain location or involved certain entities. Currently, the degree of belief/accuracy/evidence reliability can be modeled on a simple 1-2-3 scale and represented graphically with line quality on the visual representation 18.

Image Data Objects 23

Standard icons for data objects 14 as well as small images 23 for such as but not limited to objects 20,22,24 can be used to describe entities such as people, organizations and objects. Icons are also used to describe activities. These can be standard or tailored icons, or actual images of people, places, and/or actual objects (e.g. buildings). Imagery can be used as part of the event description. Images 23 can be viewed in all of the visual representation 18 contexts, as for example shown in FIGS. 20 and 21 which show the use of images 23 in the time lines 422 and the time chart 430 views. Sequences of images 23 can be animated to help the user detect changes in the image over time and space.

Annotations 21

Figure 21:
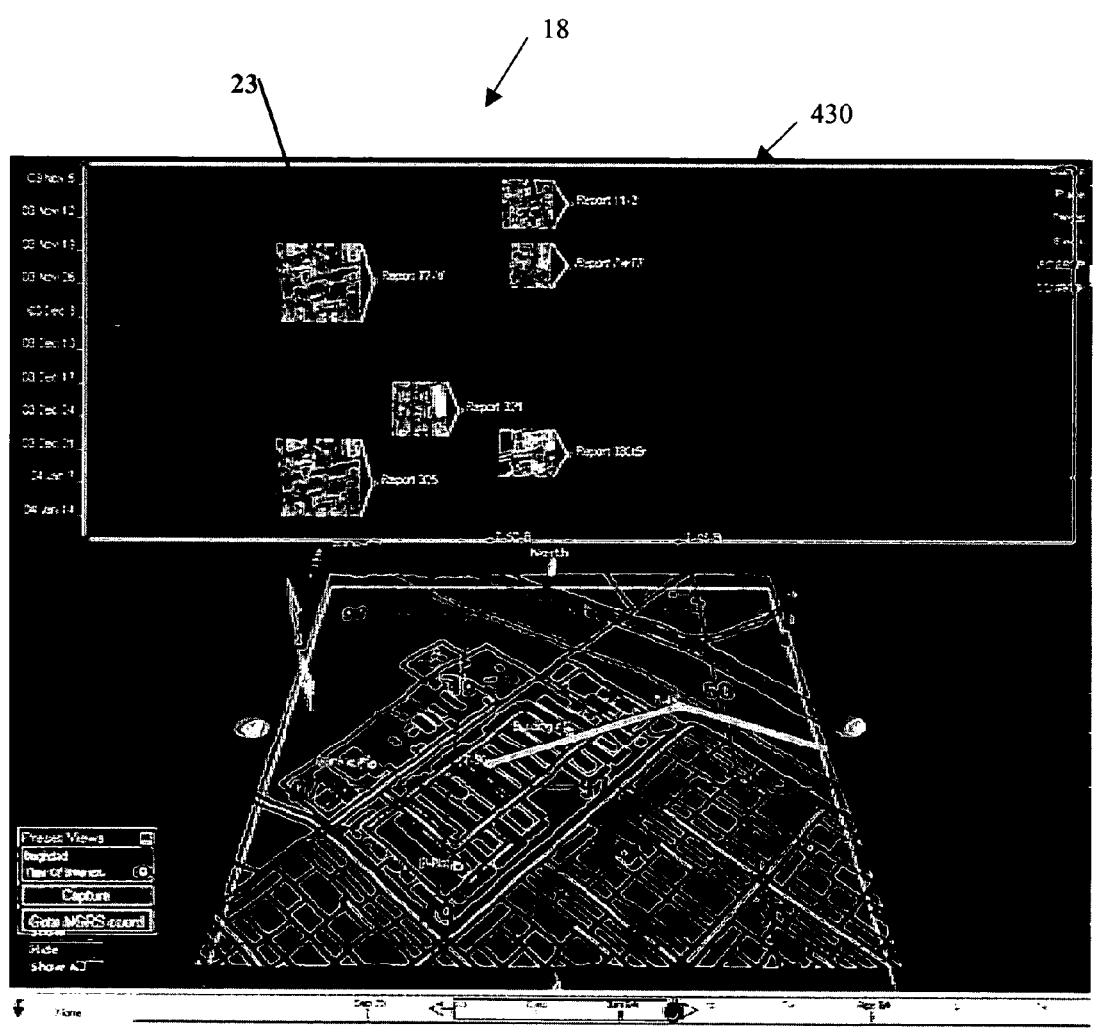
FIG. 21 is a further embodiment of FIG. 18 showing imagery in a time chart view.

Annotations 21 in Geography and Time (see FIG. 22) can be represented as manually placed lines or other shapes (e.g. pen/pencil strokes) can be placed on the visual representation 18 by an operator of the tool 12 and used to annotate elements of interest with such as but not limited to arrows, circles and freeform markings. Some examples are shown in FIG. 21. These annotations 21 are located in geography (e.g. spatial domain 400) and time (e.g. temporal domain 422) and so can appear and disappear on the visual representation 18 as geographic and time contexts are navigated through the user input events 109.

Visualization Tool 12

Figure 3:
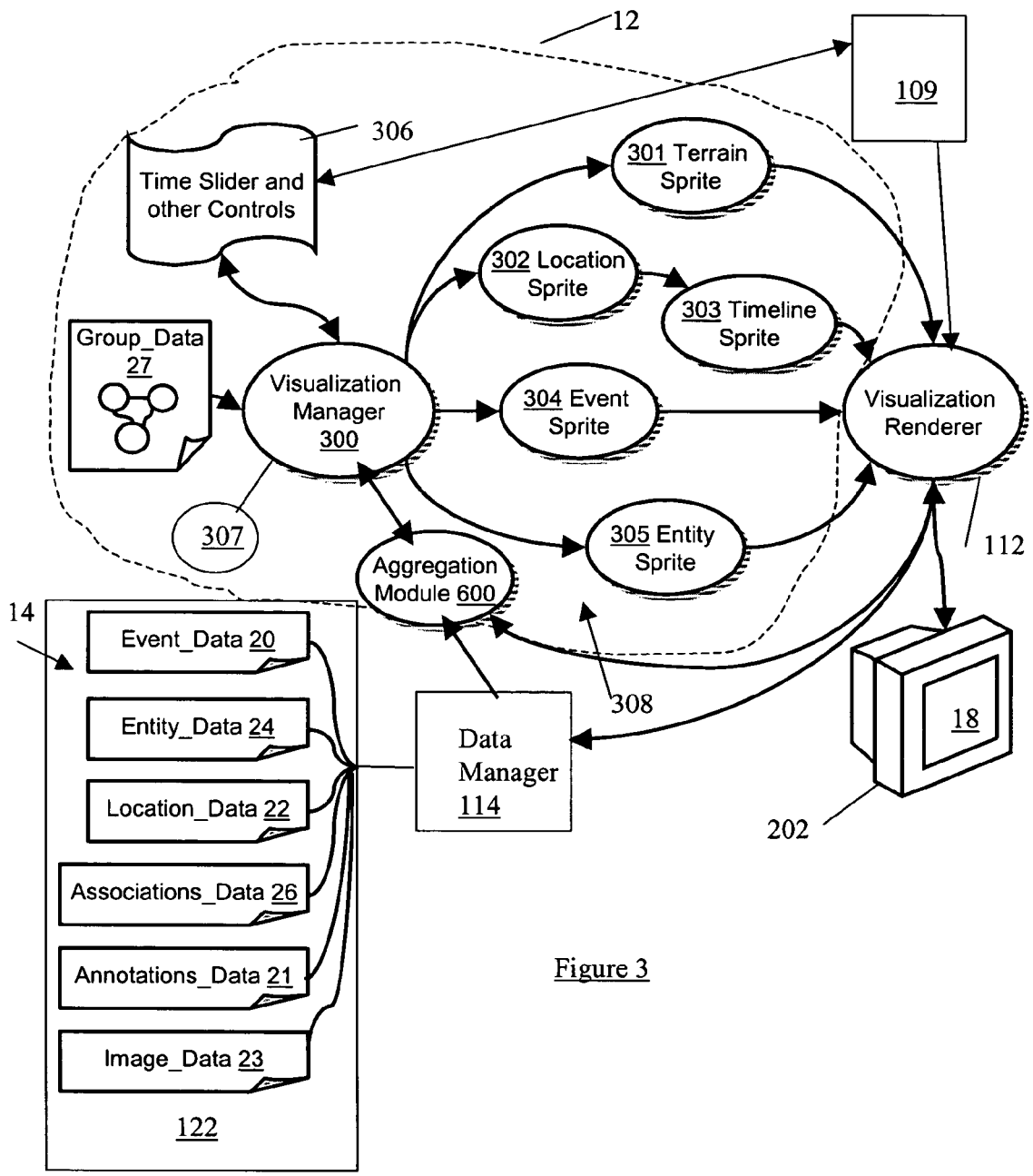
FIG. 3 shows further details of the visualization tool of FIG. 1.

Referring to FIG. 3, the visualization tool 12 has a visualization manager 300 for interacting with the data objects 14 for presentation to the interface 202 via the VI manager 112. The Data Objects 14 are formed into groups 27 through the associations 26 and processed by the Visualization Manager 300. The groups 27 comprise selected subsets of the objects 20, 21, 22, 23, 24 combined via selected associations 26. This combination of data objects 14 and association sets 16 can be accomplished through predefined groups 27 added to the tables 122 and/or through the user events 109 during interaction of the user directly with selected data objects 14 and association sets 16 via the controls 306. It is recognized that the predefined groups 27 could be loaded into the memory 102 (and tables 122) via the computer readable medium 46 (see FIG. 2). The Visualization manager 300 also processes user event 109 input through interaction with a time slider and other controls 306, including several interactive controls for supporting navigation and analysis of information within the visual representation 18 (see FIG. 1) such as but not limited to data interactions of selection, filtering, hide/show and grouping as further described below. Use of the groups 27 is such that subsets of the objects 14 can be selected and grouped through associations 26. In this way, the user of the tool 12 can organize observations into related stories or story fragments. These groupings 27 can be named with a label and visibility controls, which provide for selected display of the groups 27 on the representation 18, e.g. the groups 27 can be turned on and off with respect to display to the user of the tool 12.

The Visualization Manager 300 processes the translation from raw data objects 14 to the visual representation 18. First, Data Objects 14 and associations 16 can be formed by the Visualization Manager 300 into the groups 27, as noted in the tables 122, and then processed. The Visualization Manager 300 matches the raw data objects 14 and associations 16 with sprites 308 (i.e. visual processing objects/components that know how to draw and render visual elements for specified data objects 14 and associations 16) and sets a drawing sequence for implementation by the VI manager 112. The sprites 308 are visualization components that take predetermined information schema as input and output graphical elements such as lines, text, images and icons to the computers graphics system. Entity 24, event 20 and location 22 data objects each can have a specialized sprite 308 type designed to represent them. A new sprite instance is created for each entity, event and location instance to manage their representation in the visual representation 18 on the display.

The sprites 308 are processed in order by the visualization manager 300, starting with the spatial domain (terrain) context and locations, followed by Events and Timelines, and finally Entities. Timelines are generated and Events positioned along them. Entities are rendered last by the sprites 308 since the entities depend on Event positions. It is recognised that processing order of the sprites 308 can be other than as described above.

The Visualization manager 112 renders the sprites 308 to create the final image including visual elements representing the data objects 14 and associates 16 of the groups 27, for display as the visual representation 18 on the interface 202. After the visual representation 18 is on the interface 202, the user event 109 inputs flow into the Visualization Manager, through the VI manager 112 and cause the visual representation 18 to be updated. The Visualization Manager 300 can be optimized to update only those sprites 308 that have changed in order to maximize interactive performance between the user and the interface 202.

Layout of the Visualization Representation 18

Figure 4:
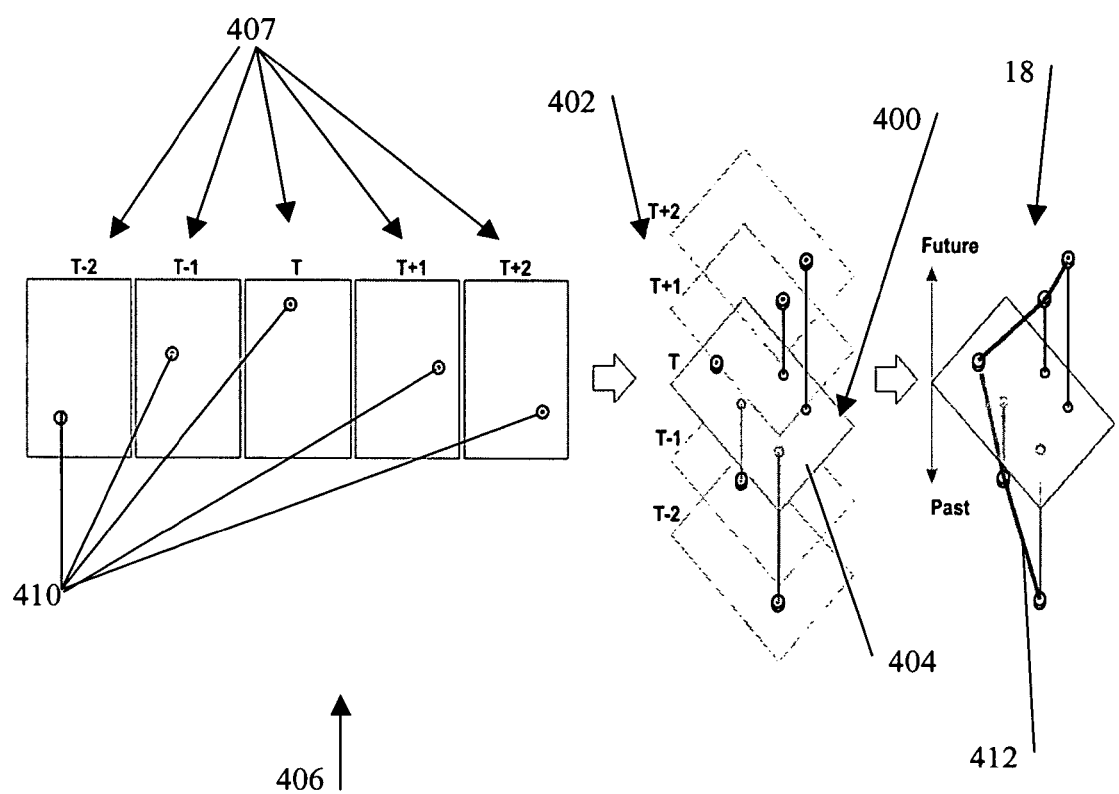
FIG. 4 shows further details of a visualization representation for display on a visualization interface of the system of FIG. 1.

The visualization technique of the visualization tool 12 is designed to improve perception of entity activities, movements and relationships as they change over time in a concurrent time-geographic or time-diagrammatical context. The visual representation 18 of the data objects 14 and associations 16 consists of a combined temporal-spatial display to show interconnecting streams of events over a range of time on a map or other schematic diagram space, both hereafter referred to in common as a spatial domain 400 (see FIG. 4). Events can be represented within an X,Y,T coordinate space, in which the X,Y plane shows the spatial domain 400 (e.g. geographic space) and the Z-axis represents a time series into the future and past, referred to as a temporal domain 402. In addition to providing the spatial context, a reference surface (or reference spatial domain) 404 marks an instant of focus between before and after, such that events "occur" when they meet the surface of the ground reference surface 404. FIG. 4 shows how the visualization manager 300 (see FIG. 3) combines individual frames 406 (spatial domains 400 taken at different times Ti 407) of event/entity/location visual elements 410, which are translated into a continuous integrated spatial and temporal visual representation 18. It should be noted connection visual elements 412 can represent presumed location (interpolated) of Entity between the discrete event/entity/location represented by the visual elements 410. Another interpretation for connections elements 412 could be signifying communications between different Entities at different locations, which are related to the same event as further described below.

Figure 5:
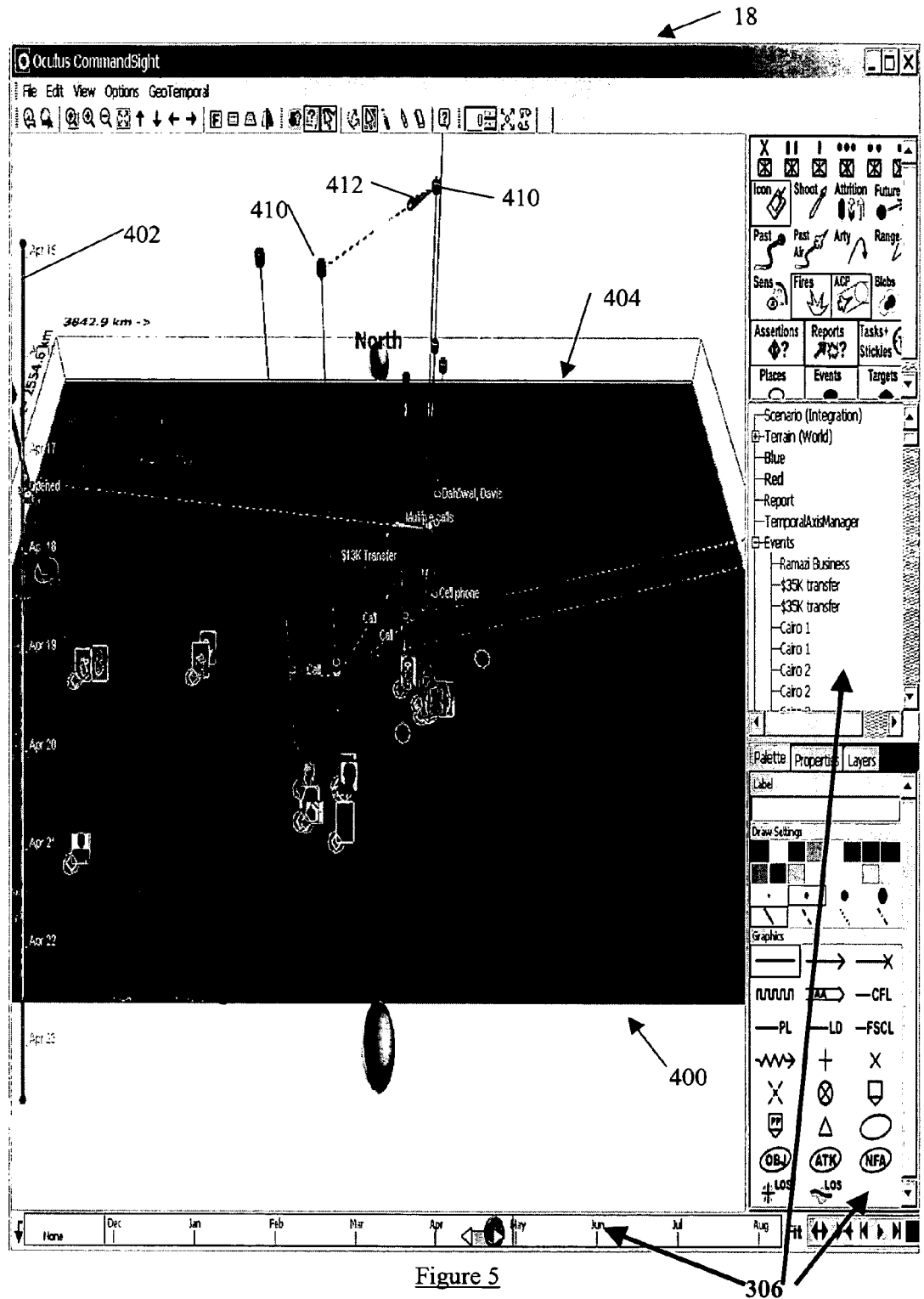
FIG. 5 is an example visualization representation of FIG. 1 showing Events in Concurrent Time and Space.

Referring to FIG. 5, an example visual representation 18 visually depicts events over time and space in an x, y, t space (or x, y, z, t space with elevation data). The example visual representation 18 generated by the tool 12 (see FIG. 2) is shown having the time domain 402 as days in April, and the spatial domain 400 as a geographical map providing the instant of focus (of the reference surface 404) as sometime around noon on April 23—the intersection point between the timelines 422 and the reference surface 404 represents the instant of focus. The visualization representation 18 represents the temporal 402, spatial 400 and connectivity elements 412 (between two visual elements 410) of information within a single integrated picture on the interface 202 (see FIG. 1). Further, the tool 12 provides an interactive analysis tool for the user with interface controls 306 to navigate the temporal, spatial and connectivity dimensions. The tool 12 is suited to the interpretation of any information in which time, location and connectivity are key dimensions that are interpreted together. The visual representation 18 is used as a visualization technique for displaying and tracking events, people, and equipment within the combined temporal and spatial domains 402, 400 display. Tracking and analyzing entities 24 and streams has traditionally been the domain of investigators, whether that be police services or military intelligence. In addition, business users also analyze events 20 in time and spatial domains 400, 402 to better understand phenomenon such as customer behavior or transportation patterns. The visualization tool 12 can be applied for both reporting and analysis.

The visual representation 18 can be applied as an analyst workspace for exploration, deep analysis and presentation for such as but not limited to:
Situations involving people and organizations that interact over time and in which geography or territory plays a role;
Storing and reviewing activity reports over a given period. Used in this way the representation 18 could provide a means to determine a living history, context and lessons learned from past events; and
As an analysis and presentation tool for long term tracking and surveillance of persons and equipment activities.

The visualization tool 12 provides the visualization representation 18 as an interactive display, such that the users (e.g. intelligence analysts, business marketing analysts) can view, and work with, large numbers of events. Further, perceived patterns, anomalies and connections can be explored and subsets of events can be grouped into "story" or hypothesis fragments. The visualization tool 12 includes a variety of capabilities such as but not limited to:
An event-based information architecture with places, events, entities (e.g. people) and
relationships;
Past and future time visibility and animation controls;
Data input wizards for describing single events and for loading many events from a table;
Entity and event connectivity analysis in time and geography;
Path displays in time and geography;
Configurable workspaces allowing ad hoc, drag and drop arrangements of events;
Search, filter and drill down tools;
Creation of sub-groups and overlays by selecting events and dragging them into sets (along with associated spatial/time scope properties); and
Adaptable display functions including dynamic show/hide controls.
Example objects 14 with associations 16

In the visualization tool 12, specific combinations of associated data elements (objects 20, 22, 24 and associations 26) can be defined. These defined groups 27 are represented visually as visual elements 410 in specific ways to express various types of occurrences in the visual representation 18. The following are examples of how the groups 27 of associated data elements can be formed to express specific occurrences and relationships shown as the connection visual elements 412.

Figure 6:
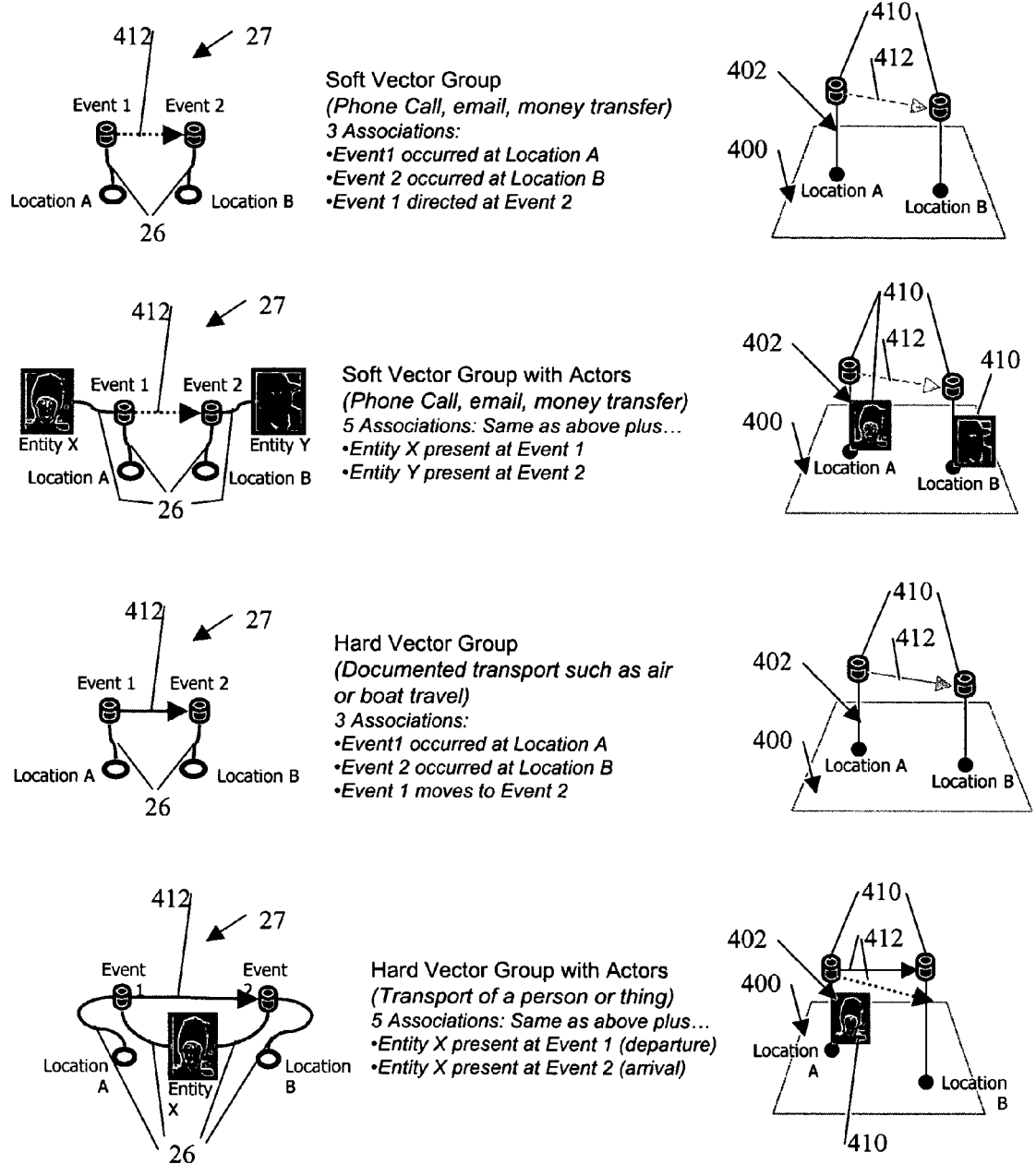
FIG. 6 shows example data objects and associations of FIG. 1.
Figure 7:
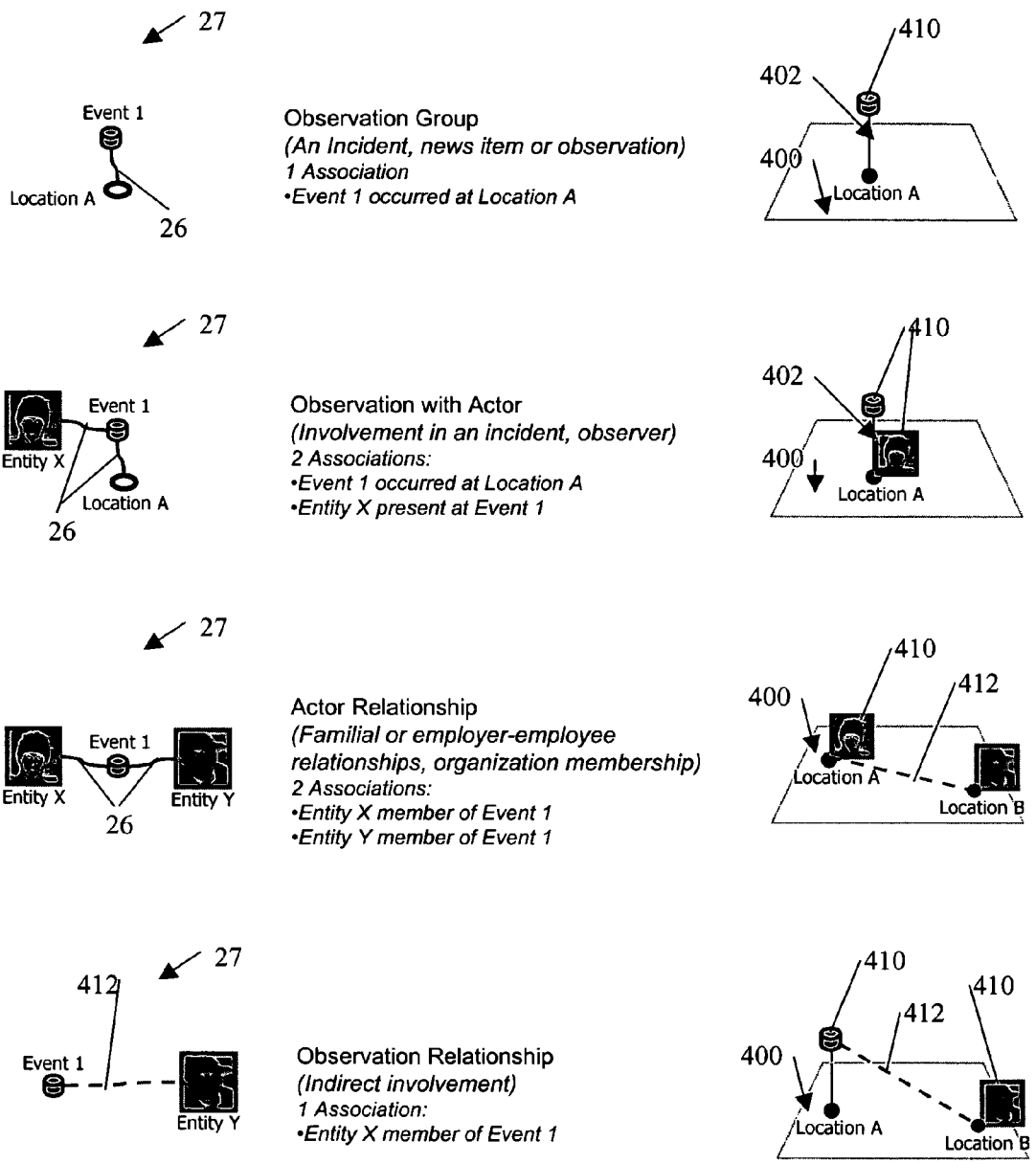
FIG. 7 shows further example data objects and associations of FIG. 1.

Referring to FIGS. 6 and 7, example groups 27 (denoting common real world occurrences) are shown with selected subsets of the objects 20, 22, 24 combined via selected associations 26. The corresponding visualization representation 18 is shown as well including the temporal domain 402, the spatial domain 400, connection visual elements 412 and the visual elements 410 representing the event/entity/location combinations. It is noted that example applications of the groups 27 are such as but not limited to those shown in FIGS. 6 and 7. In the FIGS. 6 and 7 it is noted that event objects 20 are labeled as "Event 1", "Event 2", location objects 22 are labeled as "Location A", "Location B", and entity objects 24 are labeled as "Entity X", "Entity Y". The set of associations 16 are labeled as individual associations 26 with connections labeled as either solid or dotted lines 412 between two events, or dotted in the case of an indirect connection between two locations.

Visual Elements Corresponding to Spatial and Temporal Domains

The visual elements 410 and 412, their variations and behavior facilitate interpretation of the concurrent display of events in the time 402 and space 400 domains. In general, events reference the location at which they occur and a list of Entities and their role in the event. The time at which the event occurred or the time span over which the event occurred are stored as parameters of the event.

Spatial Domain Representation

Figure 8:
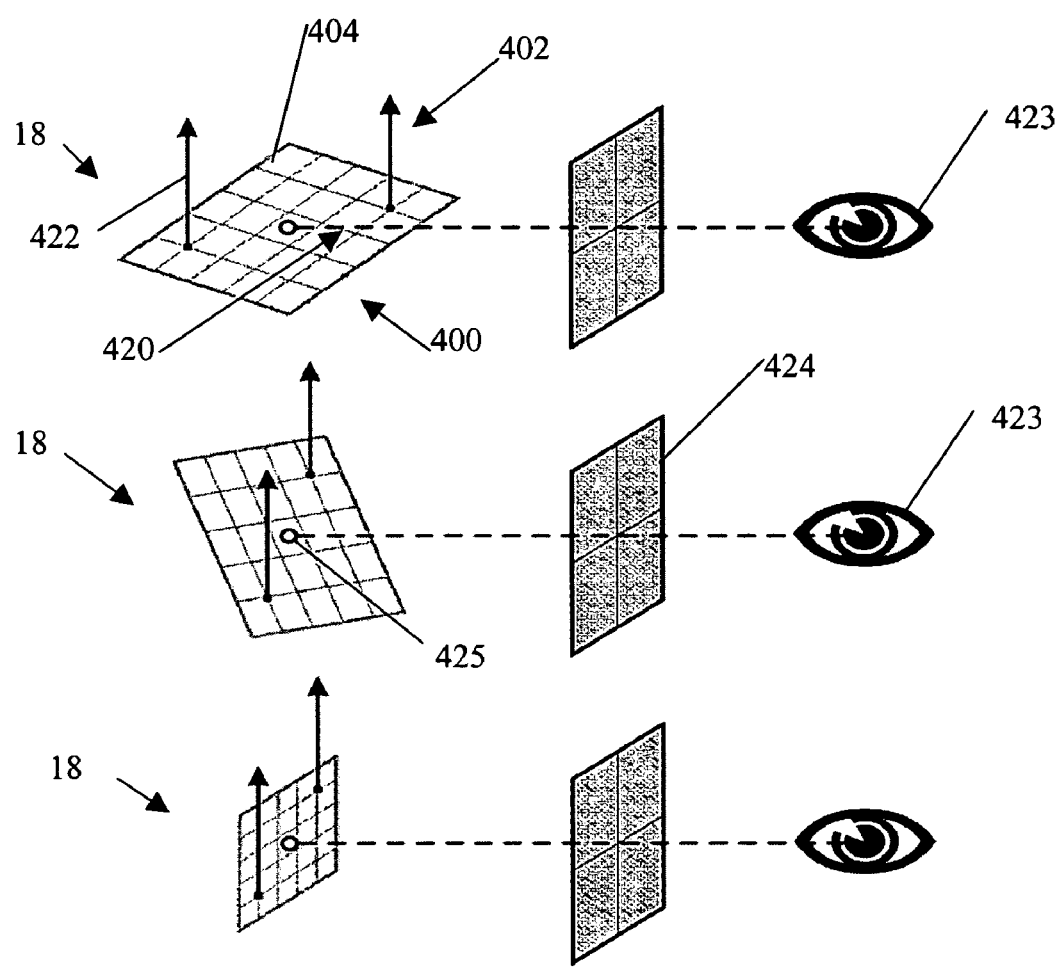
FIG. 8 shows changes in orientation of a reference surface of the visualization representation of FIG. 1.

Referring to FIG. 8, the primary organizing element of the visualization representation 18 is the 2D/3D spatial reference frame (subsequently included herein with reference to the spatial domain 400). The spatial domain 400 consists of a true 2D/3D graphics reference surface 404 in which a 2D or 3 dimensional representation of an area is shown. This spatial domain 400 can be manipulated using a pointer device (not shown—part of the controls 306—see FIG. 3) by the user of the interface 108 (see FIG. 2) to rotate the reference surface 404 with respect to a viewpoint 420 or viewing ray extending from a viewer 423. The user (i.e. viewer 423) can also navigate the reference surface 404 by scrolling in any direction, zooming in or out of an area and selecting specific areas of focus. In this way the user can specify the spatial dimensions of an area of interest the reference surface 404 in which to view events in time. The spatial domain 400 represents space essentially as a plane (e.g. reference surface 404), however is capable of representing 3 dimensional relief within that plane in order to express geographical features involving elevation. The spatial domain 400 can be made transparent so that timelines 422 of the temporal domain 402 can extend behind the reference surface 404 are still visible to the user. FIG. 8 shows how the viewer 423 facing timelines 422 can rotate to face the viewpoint 420 no matter how the reference surface 404 is rotated in 3 dimensions with respect to the viewpoint 420.

The spatial domain 400 includes visual elements 410, 412 (see FIG. 4) that can represent such as but not limited to map information, digital elevation data, diagrams, and images used as the spatial context. These types of spaces can also be combined into a workspace. The user can also create diagrams using drawing tools (of the controls 306—see FIG. 3) provided by the visualization tool 12 to create custom diagrams and annotations within the spatial domain 400.

Event Representation and Interactions

Referring to FIGS. 4 and 8, events are represented by a glyph, or icon as the visual element 410, placed along the timeline 422 at the point in time that the event occurred. The glyph can be actually a group of graphical objects, or layers, each of which expresses the content of the event data object 20 (see FIG. 1) in a different way. Each layer can be toggled and adjusted by the user on a per event basis, in groups or across all event instances. The graphical objects or layers for event visual elements 410 are such as but not limited to:

1. Text label

The Text label is a text graphic meant to contain a short description of the event content.

This text always faces the viewer 423 no matter how the reference surface 404 is oriented. The text label incorporates a de-cluttering function that separates it from other labels if they overlap. When two events are connected with a line (see connections 412 below) the label will be positioned at the midpoint of the connection line between the events. The label will be positioned at the end of a connection line that is clipped at the edge of the display area.

2. Indicator—Cylinder, Cube or Sphere

The indicator marks the position in time. The color of the indicator can be manually set by the user in an event properties dialog. Color of event can also be set to match the Entity that is associated with it. The shape of the event can be changed to represent different aspect of information and can be set by the user. Typically it is used to represent a dimension such as type of event or level of importance.

3. Icon

An icon or image can also be displayed at the event location. This icon/image 23 may used to describe some aspect of the content of the event. This icon/image 23 may be user-specified or entered as part of a data file of the tables 122 (see FIG. 2).

4. Connection elements 412

Connection elements 412 can be lines, or other geometrical curves, which are solid or dashed lines that show connections from an event to another event, place or target. A connection element 412 may have a pointer or arrowhead at one end to indicate a direction of movement, polarity, sequence or other vector-like property. If the connected object is outside of the display area, the connection element 412 can be coupled at the edge of the reference surface 404 and the event label will be positioned at the clipped end of the connection element 412.

5. Time Range Indicator

A Time Range Indicator (not shown) appears if an event occurs over a range of time. The time range can be shown as a line parallel to the timeline 422 with ticks at the end points. The event Indicator (see above) preferably always appears at the start time of the event.

The Event visual element 410 can also be sensitive to interaction. The following user events 109 via the user interface 108 (see FIG. 2) are possible, such as but not limited to:

Mouse-Left-Click:
   Selects the visual element 410 of the visualization representation 18 on the VI 202 (see FIG. 2) and highlights it, as well as simultaneously deselecting any previously selected visual element 410, as desired.

Ctrl-Mouse-Left-Click and Shift-Mouse-Left-Click
   Adds the visual element 410 to an existing selection set.

Mouse-Left-Double-Click:
   Opens a file specified in an event data parameter if it exists. The file will be opened in a system-specified default application window on the interface 202 based on its file type.

Mouse-Right-Click:
   Displays an in-context popup menu with options to hide, delete and set properties.

Mouse over Drilldown:
When the mouse pointer (not shown) is placed over the indicator, a text window is displayed next to the pointer, showing information about the visual element 410. When the mouse pointer is moved away from the indicator, the text window disappears.

Location Representation

Locations are visual elements 410 represented by a glyph, or icon, placed on the reference surface 404 at the position specified by the coordinates in the corresponding location data object 22 (see FIG. 1). The glyph can be a group of graphical objects, or layers, each of which expresses the content of the location data object 22 in a different way. Each layer can be toggled and adjusted by the user on a per Location basis, in groups or across all instances. The visual elements 410 (e.g. graphical objects or layers) for Locations are such as but not limited to:

1. Text Label

The Text label is a graphic object for displaying the name of the location. This text always faces the viewer 422 no matter how the reference surface 404 is oriented. The text label incorporates a de-cluttering function that separates it from other labels if they overlap.

2. Indicator

The indicator is an outlined shape that marks the position or approximate position of the Location data object 22 on the reference surface 404. There are, such as but not limited to, 7 shapes that can be selected for the locations visual elements 410 (marker) and the shape can be filled or empty. The outline thickness can also be adjusted. The default setting can be a circle and can indicate spatial precision with size. For example, more precise locations, such as addresses, are smaller and have thicker line width, whereas a less precise location is larger in diameter, but uses a thin line width.

The Location visual elements 410 are also sensitive to interaction. The following interactions are possible:

Mouse-Left-Click:
Selects the location visual element 410 and highlights it, while deselecting any previously selected location visual elements 410.

Ctrl-Mouse-Left-Click and Shift-Mouse-Left-Click
Adds the location visual element 410 to an existing selection set.

Mouse-Left-Double-Click:
Opens a file specified in a Location data parameter if it exists. The file will be opened in a system-specified default application window based on its file type.

Mouse-Right-Click:
Displays an in-context popup menu with options to hide, delete and set properties of the location visual element 410.

Mouseover Drilldown:
When the Mouse pointer is placed over the location indicator, a text window showing information about the location visual element 410 is displayed next to the pointer. When the mouse pointer is moved away from the indicator, the text window disappears.

Mouse-Left-Click-Hold-and-Drag:
Interactively repositions the location visual element 410 by dragging it across the reference surface 404.

Non-Spatial Locations

Locations have the ability to represent indeterminate position. These are referred to as non-spatial locations. Locations tagged as non-spatial can be displayed at the edge of the reference surface 404 just outside of the spatial context of the spatial domain 400. These non-spatial or virtual locations can be always visible no matter where the user is currently zoomed in on the reference surface 404. Events and Timelines 422 that are associated with non-spatial Locations can be rendered the same way as Events with spatial Locations.

Entity Representation

Entity visual elements 410 are represented by a glyph, or icon, and can be positioned on the reference surface 404 or other area of the spatial domain 400, based on associated Event data that specifies its position at the current Moment of Interest 900 (see FIG. 9) (i.e. specific point on the timeline 422 that intersects the reference surface 404). If the current Moment of Interest 900 lies between 2 events in time that specify different positions, the Entity position will be interpolated between the 2 positions. Alternatively, the Entity could be positioned at the most recent known location on he reference surface 404. The Entity glyph is actually a group of the entity visual elements 410 (e.g. graphical objects, or layers) each of which expresses the content of the event data object 20 in a different way. Each layer can be toggled and adjusted by the user on a per event basis, in groups or across all event instances. The entity visual elements 410 are such as but not limited to:

1. Text Label

The Text label is a graphic object for displaying the name of the Entity. This text always faces the viewer no matter how the reference surface 404 is oriented. The text label incorporates a de-cluttering function that separates it from other labels if they overlap.

2. Indicator

The indicator is a point showing the interpolated or real position of the Entity in the spatial context of the reference surface 404. The indicator assumes the color specified as an Entity color in the Entity data model.

3. Image Icon

An icon or image is displayed at the Entity location. This icon may used to represent the identity of the Entity. The displayed image can be user-specified or entered as part of a data file. The Image Icon can have an outline border that assumes the color specified as the Entity color in the Entity data model. The Image Icon incorporates a de-cluttering function that separates it from other Entity Image Icons if they overlap.

4. Past Trail

The Past Trail is the connection visual element 412, as a series of connected lines that trace previous known positions of the Entity over time, starting from the current Moment of Interest 900 and working backwards into past time of the timeline 422. Previous positions are defined as Events where the Entity was known to be located. The Past Trail can mark the path of the Entity over time and space simultaneously.

5. Future Trail

The Future Trail is the connection visual element 412, as a series of connected lines that trace future known positions of the Entity over time, starting from the current Moment of Interest 900 and working forwards into future time. Future positions are defined as Events where the Entity is known to be located. The Future Trail can mark the future path of the Entity over time and space simultaneously.

The Entity representation is also sensitive to interaction. The following interactions are possible, such as but not limited to:

Mouse-Left-Click:
Selects the entity visual element 410 and highlights it and deselects any previously selected entity visual element 410.

Ctrl-Mouse-Left-Click and Shift-Mouse-Left-Click
    Adds the entity visual element 410 to an existing selection set
Mouse-Left-Double-Click:
    Opens the file specified in an Entity data parameter if it exists. The file will be opened in a system-specified default application window based on its file type.
Mouse-Right-Click:
    Displays an in-context popup menu with options to hide, delete and set properties of the entity visual element 410.
Mouseover Drilldown:
    When the Mouse pointer is placed over the indicator, a text window showing information about the entity visual element 410 is displayed next to the pointer. When the mouse pointer is moved away from the indicator, the text window disappears.

Temporal Domain including Timelines

Figure 9:
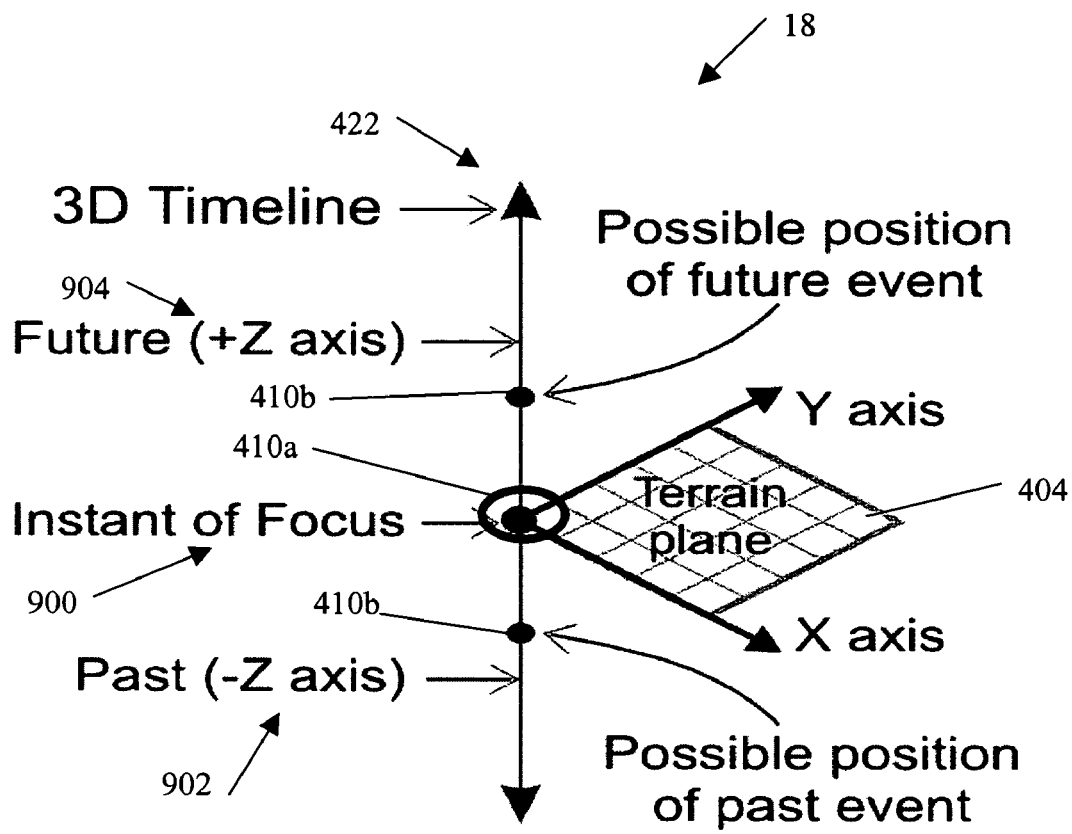
FIG. 9 is an example timeline of FIG. 8.

Referring to FIGS. 8 and 9, the temporal domain provides a common temporal reference frame for the spatial domain 400, whereby the domains 400, 402 are operatively coupled to one another to simultaneously reflect changes in interconnected spatial and temporal properties of the data elements 14 and associations 16. Timelines 422 (otherwise known as time tracks) represent a distribution of the temporal domain 402 over the spatial domain 400, and are a primary organizing element of information in the visualization representation 18 that make it possible to display events across time within the single spatial display on the VI 202 (see FIG. 1). Timelines 422 represent a stream of time through a particular Location visual element 410a positioned on the reference surface 404 and can be represented as a literal line in space. Other options for representing the timelines/time tracks 422 are such as but not limited to curved geometrical shapes (e.g. spirals) including 2D and 3D curves when combining two or more parameters in conjuction with the temporal dimension. Each unique Location of interest (represented by the location visual element 410a) has one Timeline 422 that passes through it. Events (represented by event visual elements 410b) that occur at that Location are arranged along this timeline 422 according to the exact time or range of time at which the event occurred. In this way multiple events (represented by respective event visual elements 410b) can be arranged along the timeline 422 and the sequence made visually apparent. A single spatial view will have as many timelines 422 as necessary to show every Event at every location within the current spatial and temporal scope, as defined in the spatial 400 and temporal 402 domains (see FIG. 4) selected by the user. In order to make comparisons between events and sequences of event between locations, the time range represented by multiple timelines 422 projecting through the reference surface 404 at different spatial locations is synchronized. In other words the time scale is the same across all timelines 422 in the time domain 402 of the visual representation 18. Therefore, it is recognised that the timelines 422 are used in the visual representation 18 to visually depict a graphical visualization of the data objects 14 over time with respect to their spatial properties/attributes.

For example, in order to make comparisons between events 20 and sequences of events between locations 410 of interest (see FIG. 4), the time range represented by the timelines 422 can be synchronized. In other words, the time scale can be selected as the same for every timeline 422 of the selected time range of the temporal domain 402 of the representation 18.

Representing Current, Past and Future

Three distinct strata of time are displayed by the timelines 422, namely;
    1. The "moment of interest" 900 or browse time, as selected by the user,
    2. a range 902 of past time preceding the browse time called "past", and
    3. a range 904 of time after the moment of interest 900, called "future"

On a 3D Timeline 422, the moment of focus 900 is the point at which the timeline intersects the reference surface 404. An event that occurs at the moment of focus 900 will appear to be placed on the reference surface 404 (event representation is described above). Past and future time ranges 902, 904 extend on either side (above or below) of the moment of interest 900 along the timeline 422. Amount of time into the past or future is proportional to the distance from the moment of focus 900. The scale of time may be linear or logarithmic in either direction. The user may select to have the direction of future to be down and past to be up or vice versa.

There are three basic variations of Spatial Timelines 422 that emphasize spatial and temporal qualities to varying extents. Each variation has a specific orientation and implementation in terms of its visual construction and behavior in the visualization representation 18 (see FIG. 1). The user may choose to enable any of the variations at any time during application runtime, as further described below.

3D Z-Axis Timelines

Figure 10:
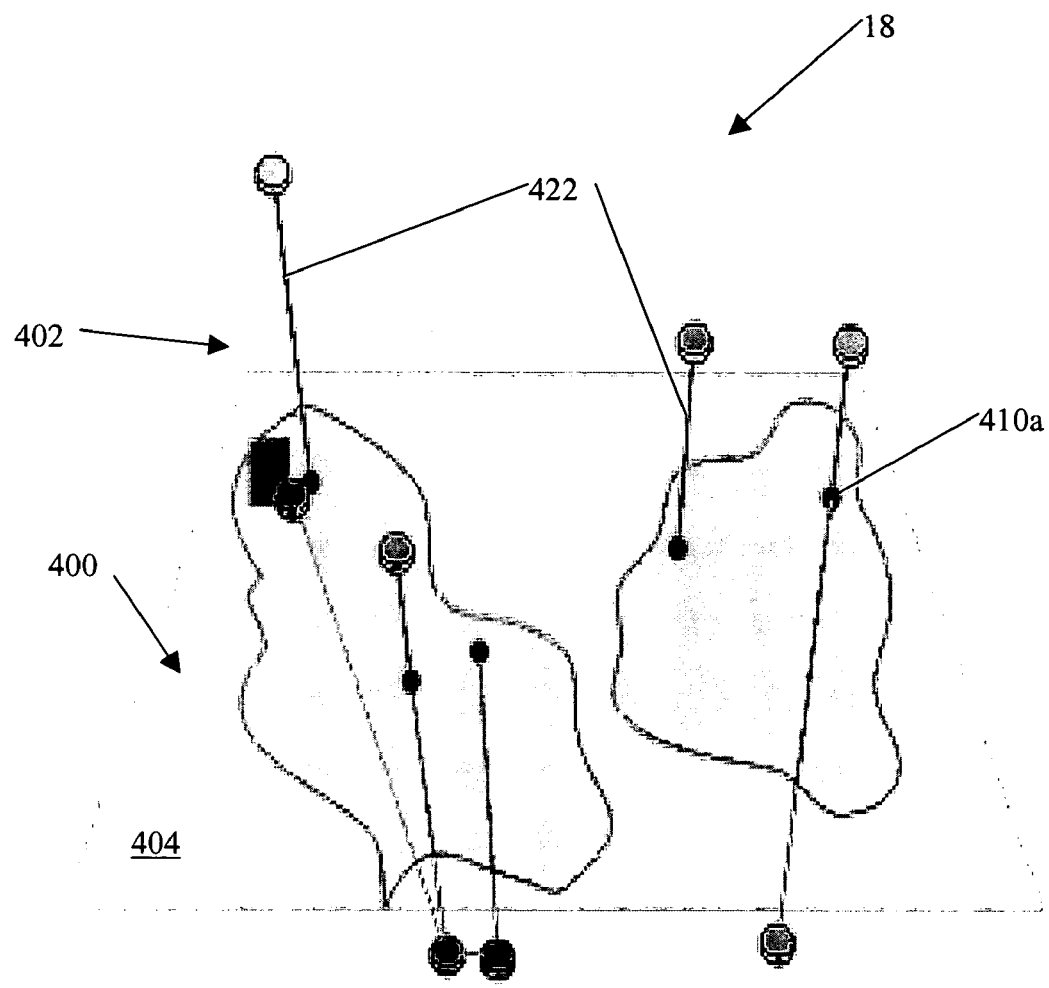
FIG. 10 is a further example timeline of FIG. 8.

FIG. 10 shows how 3D Timelines 422 pass through reference surface 404 locations 410a. 3D timelines 422 are locked in orientation (angle) with respect to the orientation of the reference surface 404 and are affected by changes in perspective of the reference surface 404 about the viewpoint 420 (see FIG. 8). For example, the 3D Timelines 422 can be oriented normal to the reference surface 404 and exist within its coordinate space. Within the 3D spatial domain 400, the reference surface 404 is rendered in the X-Y plane and the timelines 422 run parallel to the Z-axis through locations 410a on the reference surface 404. Accordingly, the 3D Timelines 422 move with the reference surface 404 as it changes in response to user navigation commands and viewpoint changes about the viewpoint 420, much like flag posts are attached to the ground in real life. The 3D timelines 422 are subject to the same perspective effects as other objects in the 3D graphical window of the VI 202 (see FIG. 1) displaying the visual representation 18. The 3D Timelines 422 can be rendered as thin cylindrical volumes and are rendered only between events 410a with which it shares a location and the location 410a on the reference surface 404. The timeline 422 may extend above the reference surface 404, below the reference surface 404, or both. If no events 410b for its location 410a are in view the timeline 422 is not shown on the visualization representation 18.

3D Viewer Facing Timelines

Referring to FIG. 8, 3D Viewer-facing Timelines 422 are similar to 3D Timelines 422 except that they rotate about a moment of focus 425 (point at which the viewing ray of the viewpoint 420 intersects the reference surface 404) so that the 3D Viewer-facing Timeline 422 always remain perpendicular to viewer 423 from which the scene is rendered. 3D Viewer-facing Timelines 422 are similar to 3D Timelines 422 except that they rotate about the moment of focus 425 so that they are always parallel to a plane 424 normal to the viewing ray between the viewer 423 and the moment of focus 425. The effect achieved is that the timelines 422 are always rendered to face the viewer 423, so that the length of the timeline 422 is always maximized and consistent. This technique allows the temporal dimension of the temporal domain 402 to be read by the viewer 423 indifferent to how the reference surface 404 many be oriented to the viewer 423. This technique is also generally referred to as "billboarding" because the information is always oriented towards the viewer 423. Using this technique the reference surface 404 can be viewed from any direction (including directly above) and the temporal information of the timeline 422 remains readable.

Linked TimeChart Timelines

Figure 11:
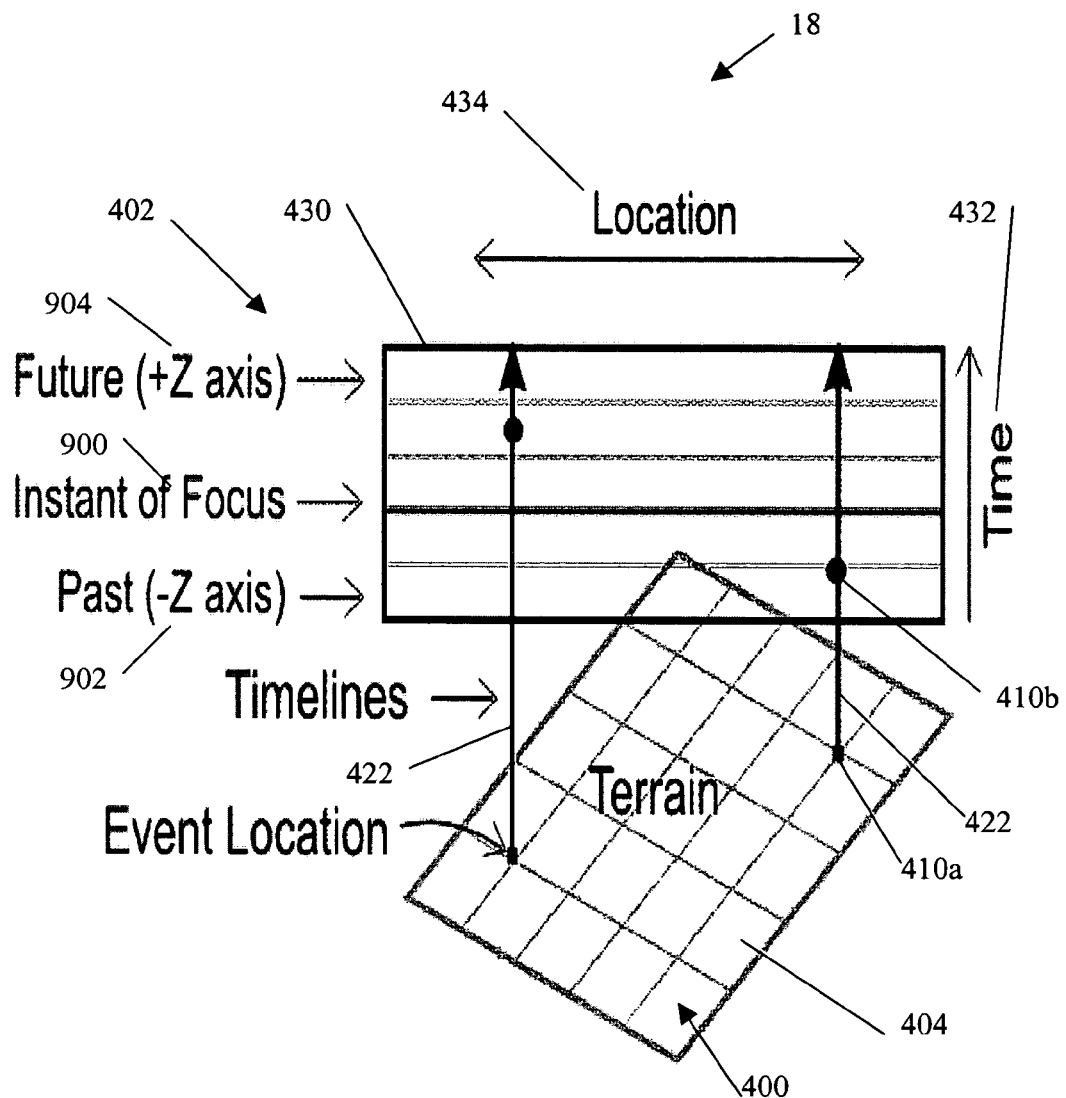
FIG. 11 is a further example timeline of FIG. 8 showing a time chart.

Referring to FIG. 11, showing how an overlay time chart 430 is connected to the reference surface 404 locations 410a by timelines 422. The timelines 422 of the Linked TimeChart 430 are timelines 422 that connect the 2D chart 430 (e.g. grid) in the temporal domain 402 to locations 410a marked in the 3D spatial domain 400. The timeline grid 430 is rendered in the visual representation 18 as an overlay in front of the 2D or 3D reference surface 404. The timeline chart 430 can be a rectangular region containing a regular or logarithmic time scale upon which event representations 410b are laid out. The chart 430 is arranged so that one dimension 432 is time and the other is location 434 based on the position of the locations 410a on the reference surface 404. As the reference surface 404 is navigated or manipulated the timelines 422 in the chart 430 move to follow the new relative location 410a positions. This linked location and temporal scrolling has the advantage that it is easy to make temporal comparisons between events since time is represented in a flat chart 430 space. The position 410b of the event can always be traced by following the timeline 422 down to the reference surface 404 to the location 410a.

Figure 12:
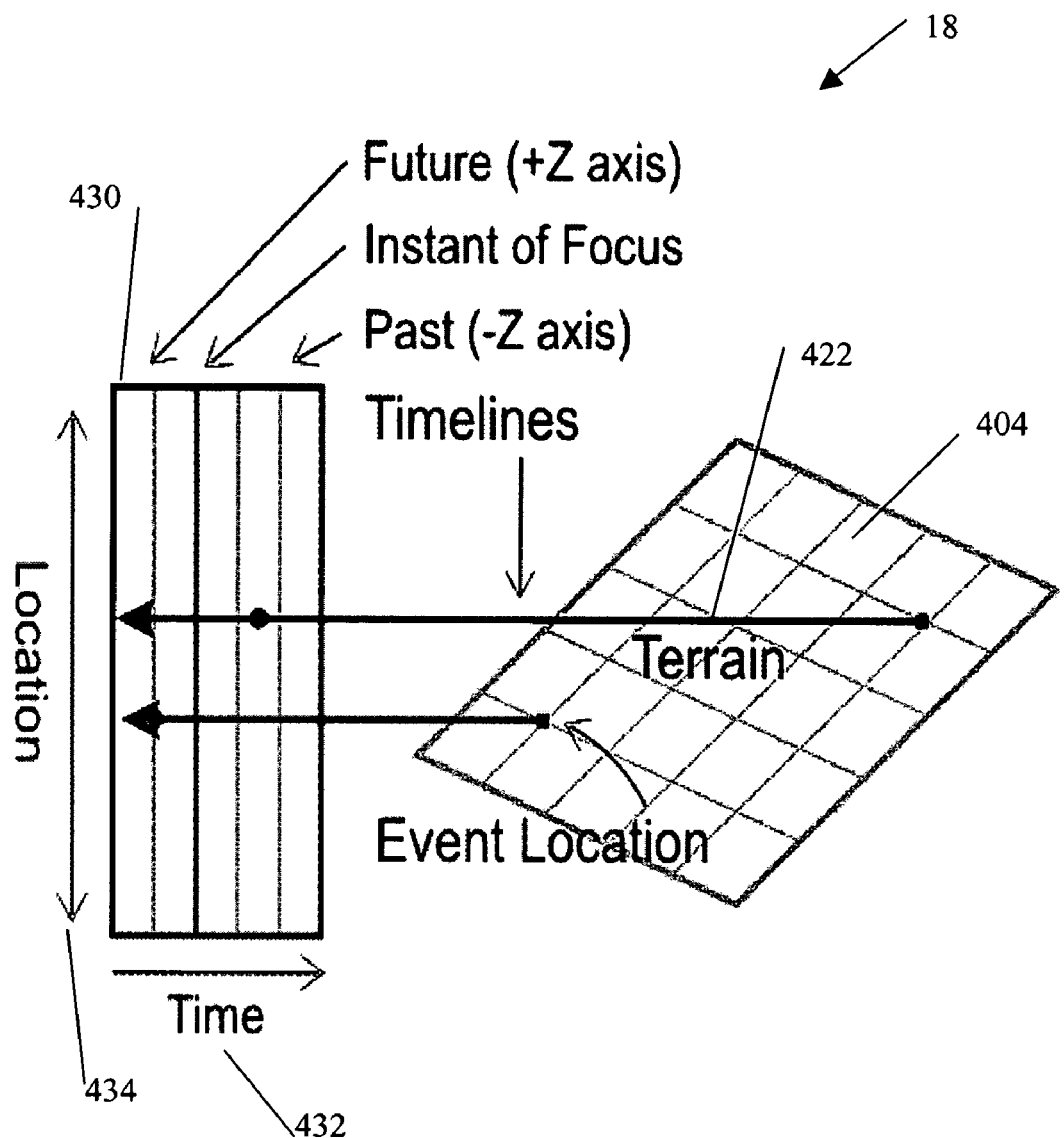
FIG. 12 is a further example of the time chart of FIG. 11.

Referring to FIGS. 11 and 12, the TimeChart 430 can be rendered in 2 orientations, one vertical and one horizontal. In the vertical mode of FIG. 11, the TimeChart 430 has the location dimension 434 shown horizontally, the time dimension 432 vertically, and the timelines 422 connect vertically to the reference surface 404. In the horizontal mode of FIG. 12, the TimeChart 430 has the location dimension 434 shown vertically, the time dimension 432 shown horizontally and the timelines 422 connect to the reference surface 404 horizontally. In both cases the TimeChart 430 position in the visualization representation 18 can be moved anywhere on the screen of the VI 202 (see FIG. 1), so that the chart 430 may be on either side of the reference surface 404 or in front of the reference surface 404. In addition, the temporal directions of past 902 and future 904 can be swapped on either side of the focus 900.

Interaction Interface Descriptions

Figure 13:
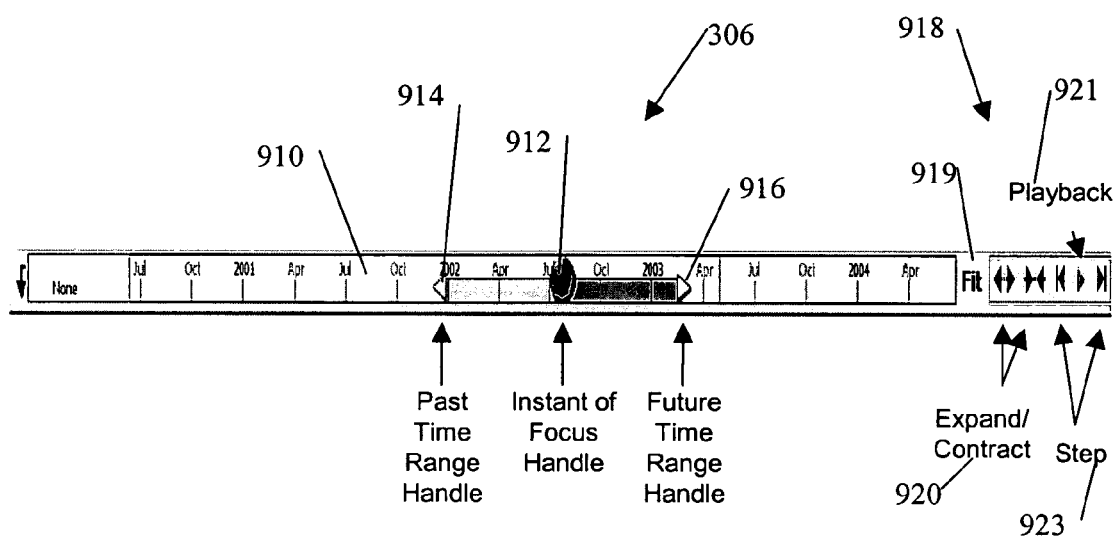
FIG. 13 shows example user controls for the visualization representation of FIG. 5.

Referring to FIGS. 3 and 13, several interactive controls 306 support navigation and analysis of information within the visualization representation 12, as monitored by the visualization manger 300 in connection with user events 109. Examples of the controls 306 are such as but not limited to a time slider 910, an instant of focus selector 912, a past time range selector 914, and a future time selector 916. It is recognized that these controls 306 can be represented on the VI 202 (see FIG. 1) as visual based controls, text controls, and/or a combination thereof.

Time and Range Slider 901

The timeline slider 910 is a linear time scale that is visible underneath the visualization representation 18 (including the temporal 402 and spatial 400 domains). The control 910 contains sub controls/selectors that allow control of three independent temporal parameters: the Instant of Focus, the Past Range of Time and the Future Range of Time.

Continuous animation of events 20 over time and geography can be provided as the time slider 910 is moved forward and backwards in time. Example, if a vehicle moves from location A at t1 to location B at t2, the vehicle (object 23,24) is shown moving continuously across the spatial domain 400 (e.g. map). The timelines 422 can animate up and down at a selected frame rate in association with movement of the slider 910.

Instant of Focus

The instant of focus selector 912 is the primary temporal control. It is adjusted by dragging it left or right with the mouse pointer across the time slider 910 to the desired position. As it is dragged, the Past and Future ranges move with it. The instant of focus 900 (see FIG. 12) (also known as the browse time) is the moment in time represented at the reference surface 404 in the spatial-temporal visualization representation 18. As the instant of focus selector 912 is moved by the user forward or back in time along the slider 910, the visualization representation 18 displayed on the interface 202 (see FIG. 1) updates the various associated visual elements of the temporal 402 and spatial 400 domains to reflect the new time settings. For example, placement of Event visual elements 410 animate along the timelines 422 and Entity visual elements 410 move along the reference surface 404 interpolating between known locations visual elements 410 (see FIGS. 6 and 7). Examples of movement are given with reference to FIGS. 14, 15, and 16 below.

Past Time Range

The Past Time Range selector 914 sets the range of time before the moment of interest 900 (see FIG. 11) for which events will be shown. The Past Time range is adjusted by dragging the selector 914 left and right with the mouse pointer. The range between the moment of interest 900 and the Past time limit can be highlighted in red (or other colour codings) on the time slider 910. As the Past Time Range is adjusted, viewing parameters of the spatial-temporal visualization representation 18 update to reflect the change in the time settings.

Future Time Range

The Future Time Range selector 914 sets the range of time after the moment of interest 900 for which events will be shown. The Future Time range is adjusted by dragging the selector 916 left and right with the mouse pointer. The range between the moment of interest 900 and the Future time limit is highlighted in blue (or other colour codings) on the time slider 910. As the Future Time Range is adjusted, viewing parameters of the spatial-temporal visualization representation 18 update to reflect the change in the time settings.

The time range visible in the time scale of the time slider 910 can be expanded or contracted to show a time span from centuries to seconds. Clicking and dragging on the time slider 910 anywhere except the three selectors 912, 914, 916 will allow the entire time scale to slide to translate in time to a point further in the future or past. Other controls 918 associated with the time slider 910 can be such as a "Fit" button 918 for automatically adjusting the time scale to fit the range of time covered by the currently active data set displayed in the visualization representation 18. A scale control 918 includes a Fit control 919, a scale-expand-contract controls 920, a step control 923, and a play control 922, which allow the user to expand or contract the time scale. A step control 918 increments the instant of focus 900 forward or back. The "playback" button 920 causes the instant of focus 900 to animate forward by a user-adjustable rate. This "playback" causes the visualization representation 18 as displayed to animate in sync with the time slider 910.

Simultaneous Spatial and Temporal Navigation can be provided by the tool 12 using, for example, interactions such as zoom-box selection and saved views. In addition, simultaneous spatial and temporal zooming can be used to provide the user to quickly move to a context of interest. In any view of the representation 18, the user may select a subset of events 20 and zoom to them in both time 402 and space 400 domains using a Fit Time and a Fit Space functions. These functions can happen simultaneously by dragging a zoom-box on to the time chart 430 itself. The time range and the geographic extents of the selected events 20 can be used to set the bounds of the new view of the representation 18, including selected domain 400,402 view formats.

Association Analysis Tools

Referring to FIGS. 1 and 3, association analysis functions 307 have been developed that take advantage of the association-based connections between Events, Entities and Locations. These functions 307 are used to find groups of connected objects 14 during analysis. The associations 16 connect these basic objects 20, 22, 24 into complex groups 27 (see FIGS. 6 and 7) representing actual occurrences. The functions 307 are used to follow the associations 16 from object 14 to object 14 to reveal connections between objects 14 that are not immediately apparent. Association analysis functions 307 are especially useful in analysis of large data sets where an efficient method to find and/or filter connected groups is desirable. For example, an Entity 24 maybe be involved in events 20 in a dozen places/locations 22, and each of those events 20 may involve other Entities 24. The association analysis function 307 can be used to display only those locations 22 on the visualization representation 18 that the entity 24 has visited or entities 24 that have been contacted.

The analysis functions 307 provide the user with different types of link analysis, such as but limited to:

1. Expanding Search

The expanding search function 307 allows the user to start with a selected object(s) 14 and then incrementally show objects 14 that are associated with it by increasing degrees of separation. The user selects an object 14 or group of objects 14 of focus and clicks on the Expanding search button 920—this causes everything in the visualization representation 18 to disappear except the selected items. The user then increments the search depth and objects 14 connected by the specified depth are made visible the display. In this way, sets of connected objects 14 are revealed as displayed using the visual elements 410 and 412.

2. Connection Search

The Connection Search function 307 allows the user to connect any two objects 14 by their web of associations 26. The user selects any two objects 14 and clicks on a Connection Search tool (not shown). The connection search function 307 works by automatically scanning the extents of the web of associations 26 starting from one of the objects 14. The search will continue until the second object 14 is found as one of the connected objects 14 or until there are no more connected objects 14. If a path of associated objects 14 between the target objects 14 exists, all of the objects 14 along that path are displayed and the depth is automatically displayed showing the minimum number of links between the objects 14.

It is recognized that the functions 307 can be used to implement filtering via such as but not limited to criteria matching, algorithmic methods and/or manual selection of objects 14 and associations 16 using the analytical properties of the tool 12. This filtering can be used to highlight/hide/show (exclusively) selected objects 14 and associations 16 as represented on the visual representation 18. The functions 307 are used to create a group (subset) of the objects 14 and associations 16 as desired by the user through the specified criteria matching, algorithmic methods and/or manual selection. Further, it is recognized that the selected group of objects 14 and associations 16 could be assigned a specific name which is stored in the table 122.

Operation of Visual Tool to Generate Visualization Representation

Figure 14:
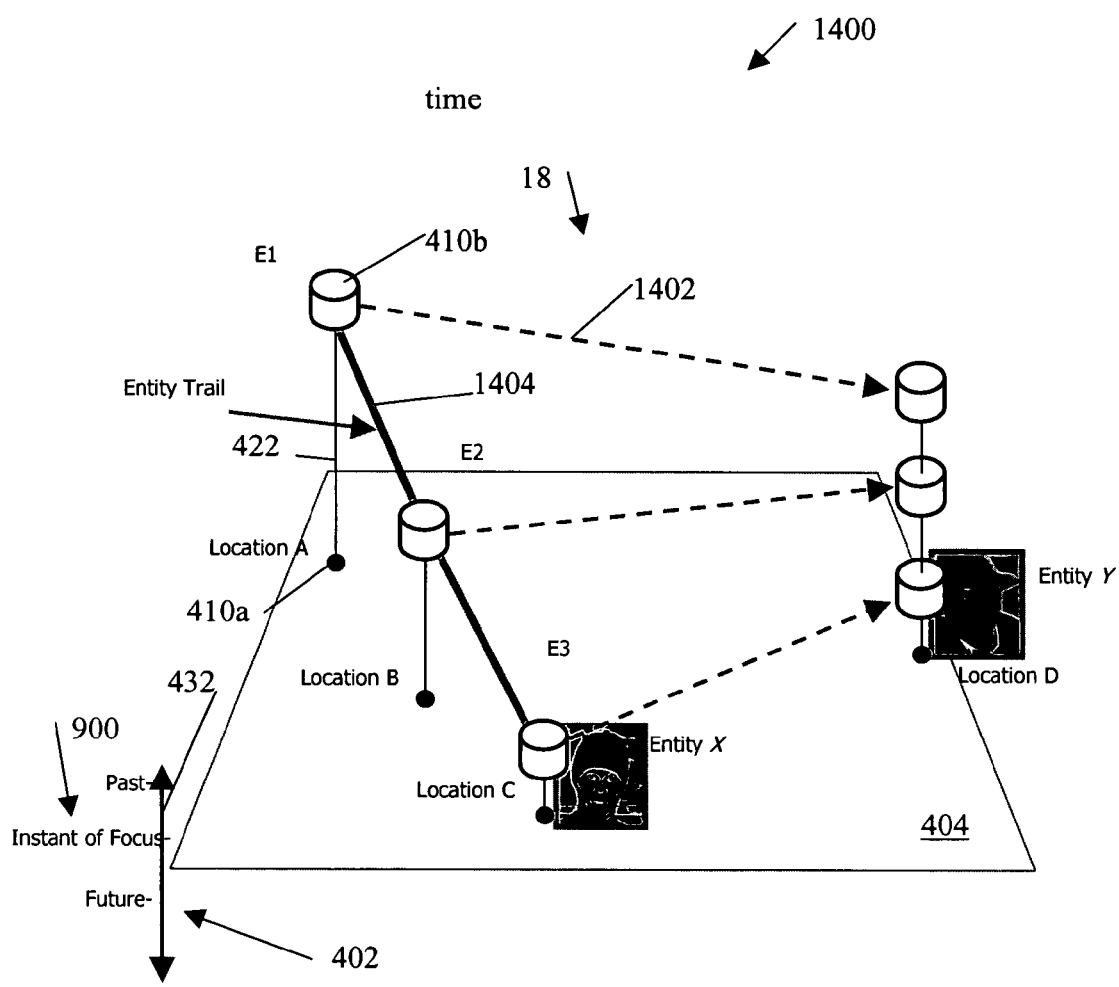
FIG. 14 shows an example operation of the tool of FIG. 3.

Referring to FIG. 14, example operation 1400 shows communications 1402 and movement events 1404 (connection visual elements 412—see FIGS. 6 and 7) between Entities "X" and "Y" over time on the visualization representation 18. This FIG. 14 shows a static view of Entity X making three phone call communications 1402 to Entity Y from 3 different locations 410a at three different times. Further, the movement events 1404 are shown on the visualization representation 18 indicating that the entity X was at three different locations 410a (location A,B,C), which each have associated timelines 422. The timelines 422 indicate by the relative distance (between the elements 410b and 410a) of the events (E1,E2,E3) from the instant of focus 900 of the reference surface 404 that these communications 1404 occurred at different times in the time dimension 432 of the temporal domain 402. Arrows on the communications 1402 indicate the direction of the communications 1402, i.e. from entity X to entity Y. Entity Y is shown as remaining at one location 410a (D) and receiving the communications 1402 at the different times on the same timeline 422.

Figure 15:
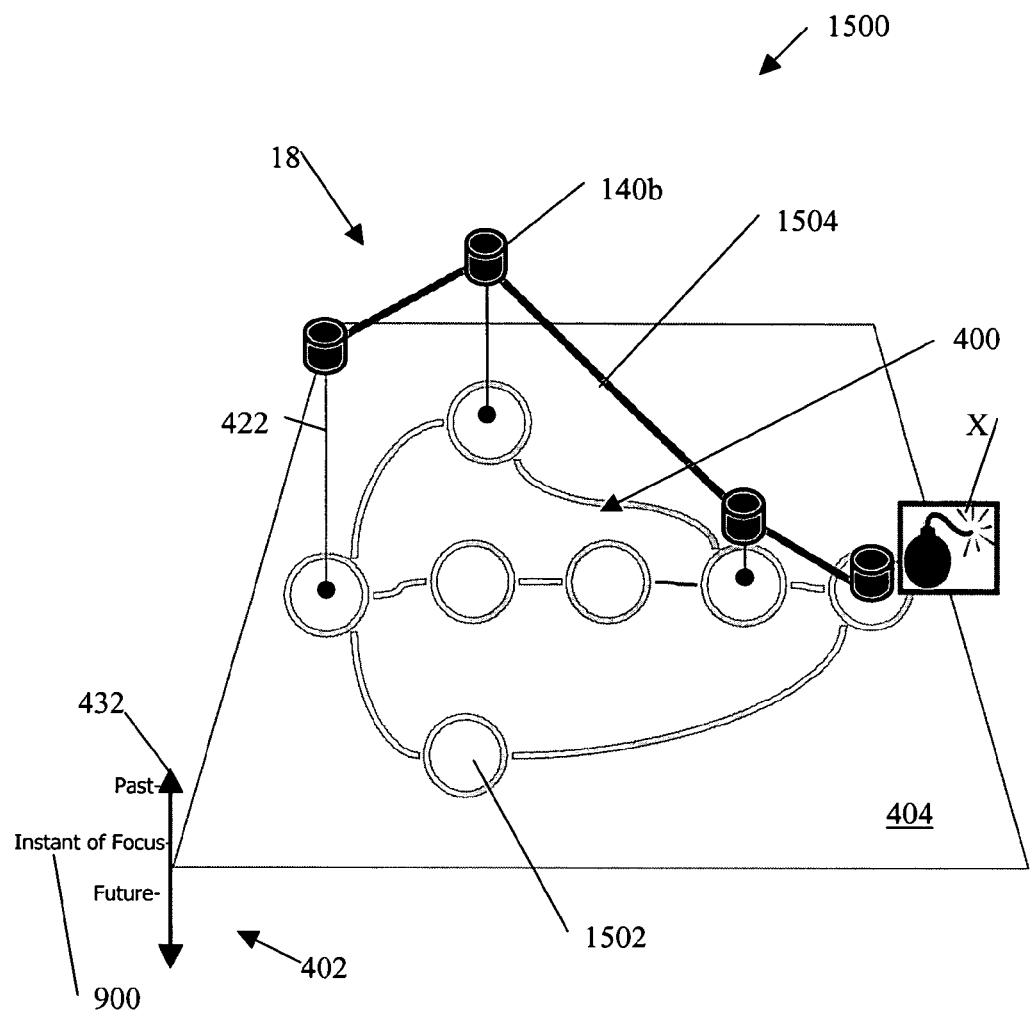
FIG. 15 shows a further example operation of the tool of FIG. 3.

Referring to FIG. 15, example operation 1500 for shows Events 140b occurring within a process diagram space domain 400 over the time dimension 432 on the reference surface 404. The spatial domain 400 represents nodes 1502 of a process. This FIG. 14 shows how a flowchart or other graphic process can be used as a spatial context for analysis. In this case, the object (entity) X has been tracked through the production process to the final stage, such that the movements 1504 represent spatial connection elements 412 (see FIGS. 6 and 7).

Figure 19:
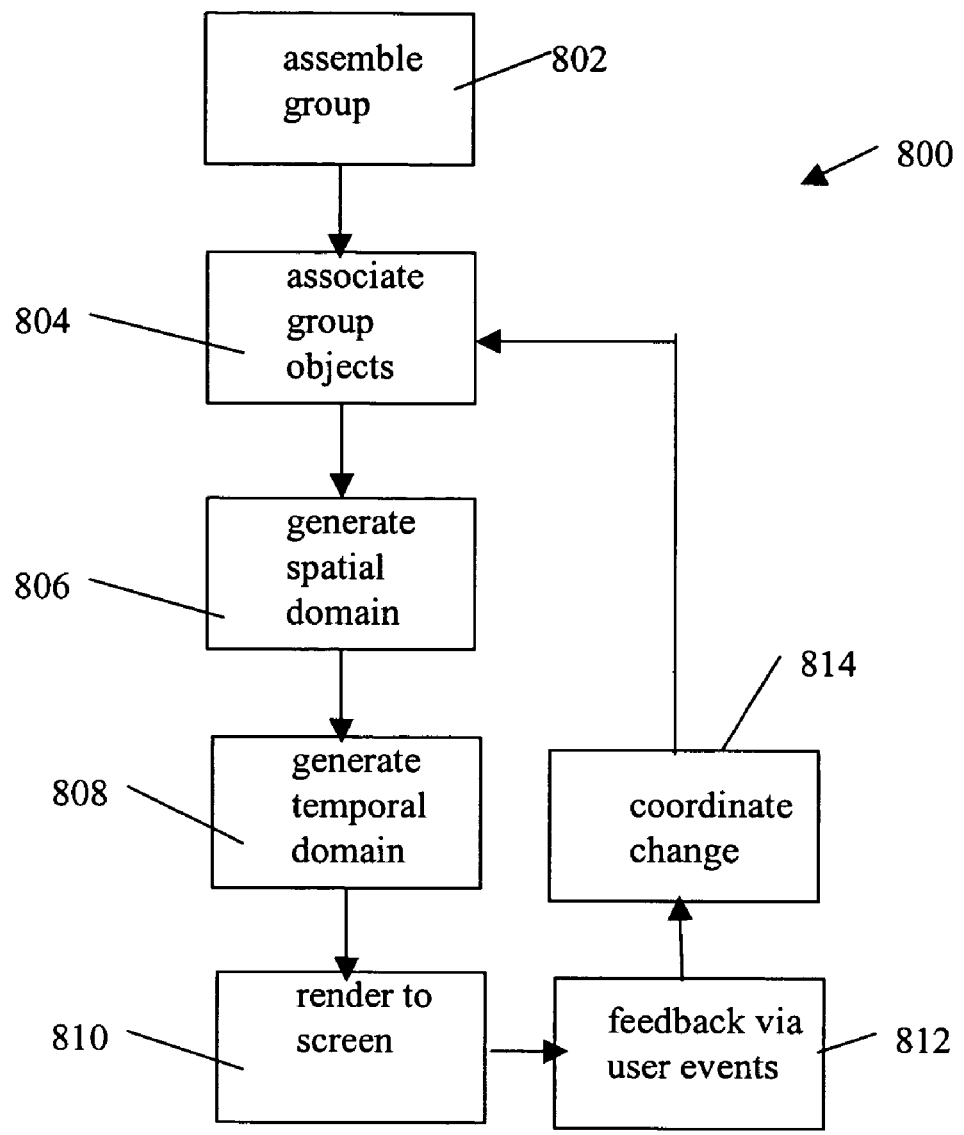
FIG. 19 is an example operation of the visualization tool of FIG. 3.

Referring to FIGS. 3 and 19, operation 800 of the tool 12 begins by the manager 300 assembling 802 the group of objects 14 from the tables 122 via the data manager 114. The selected objects 14 are combined 804 via the associations 16, including assigning the connection visual element 412 (see FIGS. 6 and 7) for the visual representation 18 between selected paired visual elements 410 corresponding to the selected correspondingly paired data elements 14 of the group. The connection visual element 412 represents a distributed association 16 in at least one of the domains 400, 402 between the two or more paired visual elements 410. For example, the connection element 412 can represent movement of the entity object 24 between locations 22 of interest on the reference surface 404, communications (money transfer, telephone call, email, etc. . . . ) between entities 24 different locations 22 on the reference surface 404 or between entities 24 at the same location 22, or relationships (e.g. personal, organizational) between entities 24 at the same or different locations 22.

Next, the manager 300 uses the visualization components 308 (e.g. sprites) to generate 806 the spatial domain 400 of the visual representation 18 to couple the visual elements 410 and 412 in the spatial reference frame at various respective locations 22 of interest of the reference surface 404. The manager 300 then uses the appropriate visualization components 308 to generate 808 the temporal domain 402 in the visual representation 18 to include various timelines 422 associated with each of the locations 22 of interest, such that the timelines 422 all follow the common temporal reference frame. The manager 112 then takes the input of all visual elements 410, 412 from the components 308 and renders them 810 to the display of the user interface 202. The manager 112 is also responsible for receiving 812 feedback from the user via user events 109 as described above and then coordinating 814 with the manager 300 and components 308 to change existing and/or create (via steps 806, 808) new visual elements 410, 412 to correspond to the user events 109. The modified/new visual elements 410, 412 are then rendered to the display at step 810.

Referring to FIG. 16, an example operation 1600 shows animating entity X movement between events (Event 1 and Event 2) during time slider 901 interactions via the selector 912. First, the Entity X is observed at Location A at time t. As the slider selector 912 is moved to the right, at time t+1 the Entity X is shown moving between known locations (Event1 and Event2). It should be noted that the focus 900 of the reference surface 404 changes such that the events 1 and 2 move along their respective timelines 422, such that Event 1 moves from the future into the past of the temporal domain 402 (from above to below the reference surface 404). The length of the timeline 422 for Event 2 (between the Event 2 and the location B on the reference surface 404 decreases accordingly. As the slider selector 912 is moved further to the right, at time t+2, Entity X is rendered at Event2 (Location B). It should be noted that the Event 1 has moved along its respective timeline 422 further into the past of the temporal domain 402, and event 2 has moved accordingly from the future into the past of the temporal domain 402 (from above to below the reference surface 404), since the representation of the events 1 and 2 are linked in the temporal domain 402. Likewise, the entity X is linked spatially in the spatial domain 400 between event 1 at location A and event 2 at location B. It is also noted that the Time Slider selector 912 could be dragged along the time slider 910 by the user to replay the sequence of events from time t to t+2, or from t+2 to t, as desired.

Figure 17:
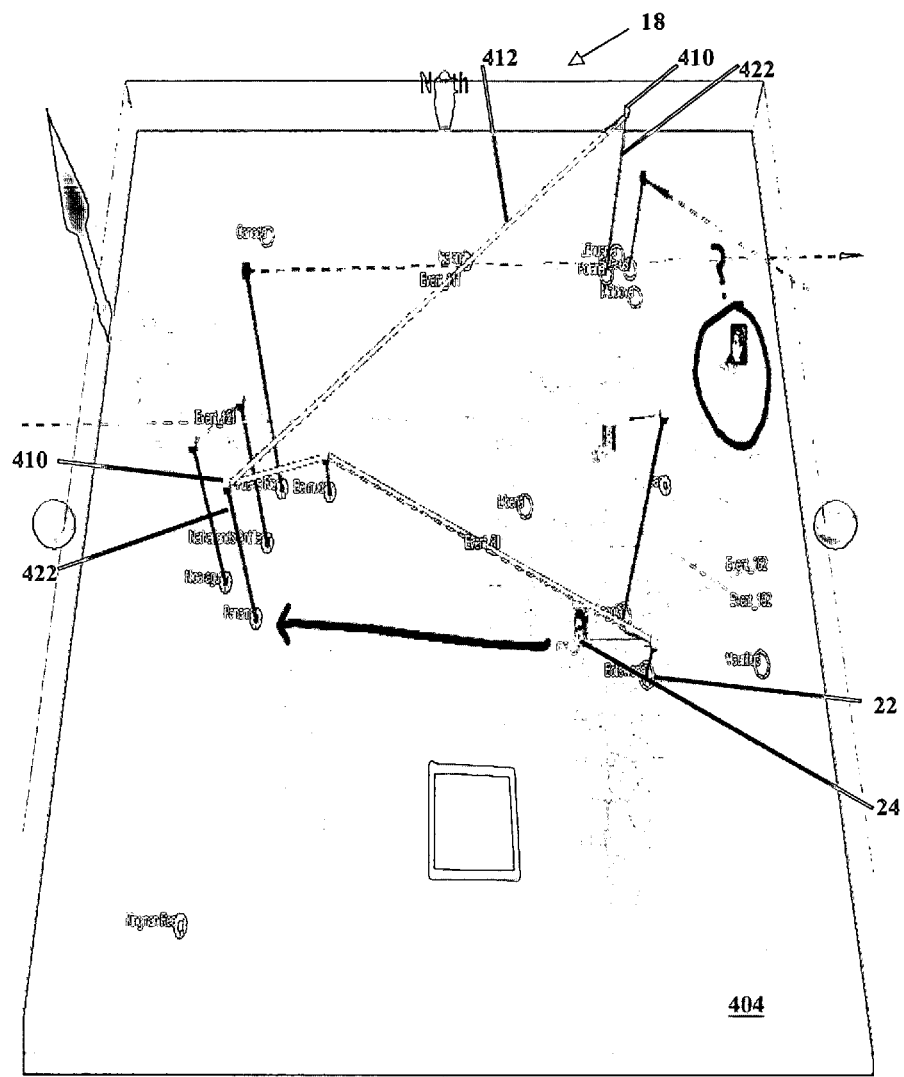
FIG. 17 shows an example visualization representation of FIG. 4 containing events and target tracking over space and time showing connections between events.

Referring to FIG. 17, the visual representation 18 shows connection visual elements 412 between visual elements 410 situated on selected various timelines 422. The timelines 422 are coupled to various locations 22 of interest on the geographical reference frame 404. In this case, the elements 412 represent geographical movement between various locations 22 by entity 24, such that all travel happened at some time in the future with respect to the instant of focus represented by the reference plane 404.

Figure 18:
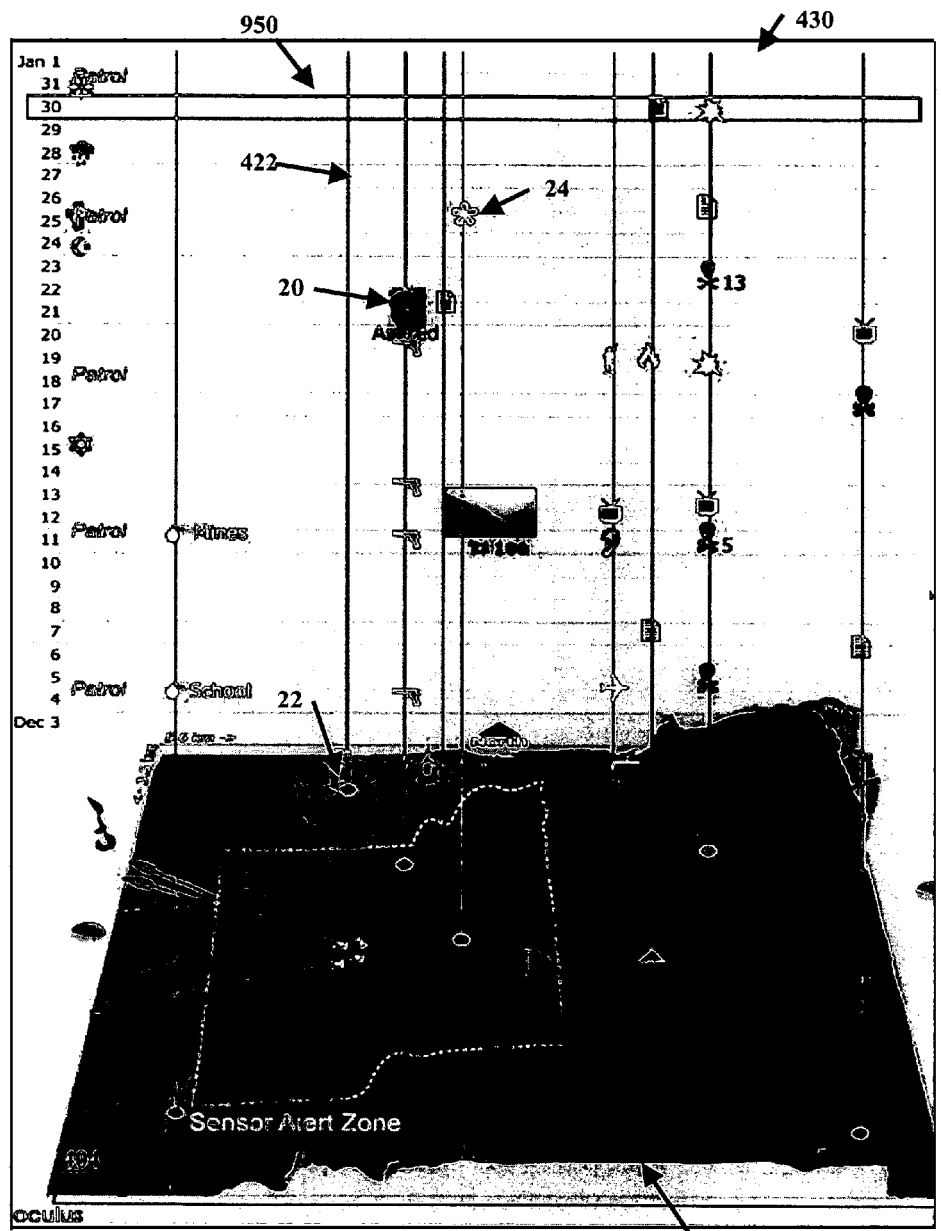
FIG. 18 shows an example visualization representation containing events and target tracking over space and time showing connections between events on a time chart of FIG. 11.

Referring to FIG. 18, the spatial domain 400 is shown as a geographical relief map. The timechart 430 is superimposed over the spatial domain of the visual representation 18, and shows a time period spanning from December 3$^{rd}$ to January 1$^{st}$ for various events 20 and entities 24 situated along various timelines 422 coupled to selected locations 22 of interest. It is noted that in this case the user can use the presented visual representation to coordinate the assignment of various connection elements 412 to the visual elements 410 (see FIG. 6) of the objects 20, 22, 24 via the user interface 202 (see FIG. 1), based on analysis of the displayed visual representation 18 content. A time selection 950 is January 30, such that events 20 and entities 24 within the selection box can be further analysed. It is recognised that the time selection 950 could be used to represent the instant of focus 900 (see FIG. 9).

Aggregation Module 600

Referring to FIG. 3, an Aggregation Module 600 is for, such as but not limited to, summarizing or aggregating the data objects 14, providing the summarized or aggregated data objects 14 to the Visualization Manager 300 which processes the translation from data objects 14 and group of data elements 27 to the visual representation 18, and providing the creation of summary charts 200 (see FIG. 26) for displaying information related to summarised/aggregated data objects 14 as the visual representation 18 on the display 108.

Figure 22:
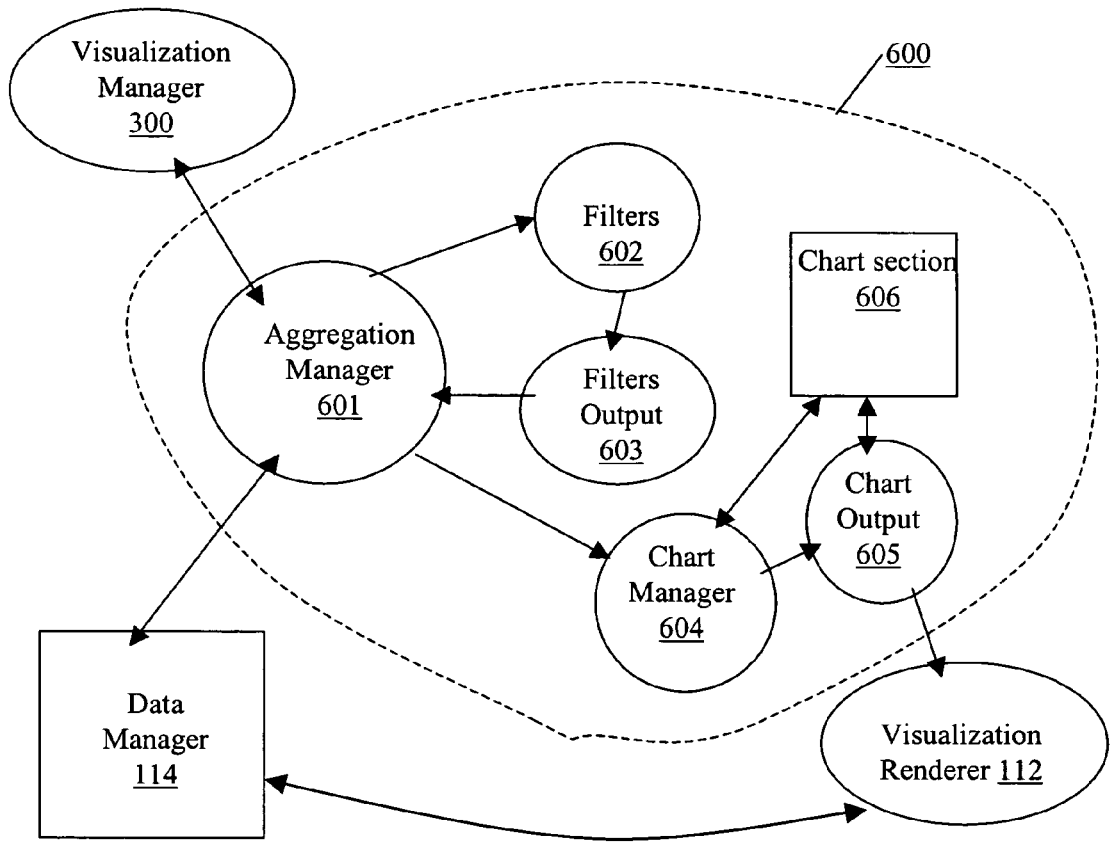
FIG. 22 shows further detail of the aggregation module of FIG. 3.

Referring to FIGS. 3 and 22, the spatial inter-connectedness of information over time and geography within a single, highly interactive 3-D view of the representation 18 is beneficial to data analysis (of the tables 122). However, when the number of data objects 14 increases, techniques for aggregation become more important. Many individual locations 22 and events 20 can be combined into a respective summary or aggregated output 603. Such outputs 603 of a plurality of individual events 20 and locations 22 (for example) can help make trends in time and space domains 400,402 more visible and comparable to the user of the tool 12. Several techniques can be implemented to support aggregation of data objects 14 such as but not limited to techniques of hierarchy of locations, user defined geo-relations, and automatic LOD level selection, as further described below. The tool 12 combines the spatial and temporal domains 400, 402 on the display 108 for analysis of complex past and future events within a selected spatial (e.g. geographic) context.

Referring to FIG. 22, the Aggregation Module 600 has an Aggregation Manager 601 that communicates with the Visualization Manager 300 for receiving aggregation parameters used to formulate the output 603. The parameters can be either automatic (e.g. tool pre-definitions) manual (entered via events 109) or a combination thereof. The manager 601 accesses all possible data objects 14 through the Data Manager 114 (related to the aggregation parameters—e.g. time and/or spatial ranges and/or object 14 types/combinations) from the tables 122, and then applies aggregation tools or filters 602 for generating the output 603. The Visualization Manager 300 receives the output 603 from the Aggregation Manager 601, based on the user events 109 and/or operation of the Time Slider and other Controls 306 by the user for providing the aggregation parameters. As described above, once the output 603 is requested by the Visualization Manager 114, the Aggregation Manager 601 communicates with the Data Manager 114 access all possible data objects 14 for satisfying the most general of the aggregation parameters and then applies the filters 602 to generate the output 603. It is recognised however, that the filters 602 could be used by the manager 601 to access only those data objects 14 from the tables 122 that satisfy the aggregation parameters, and then copy those selected data objects 14 from the tables 122 for storing/mapping as the output 603.

Accordingly, the Aggregation Manager 601 can make available the data elements 14 to the Filters 602. The filters 602 act to organize and aggregate (such as but not limited to selection of data objects 14 from the global set of data in the tables 122 according to rules/selection criteria associated with the aggregation parameters) the data objects 14 according the instructions provided by the Aggregation Manager 601. For example, the Aggregation Manager 601 could request that the Filters 602 summarize all data objects 14 with location data 22 corresponding to Paris. Or, in another example, the Aggregation Manager 601 could request that the Filters 602 summarize all data objects 14 with event data 20 corresponding to Wednesdays. Once the data objects 14 are selected by the Filters 602, the aggregated data is summarised as the output 603. The Aggregation Manager 601 then communicates the output 603 to the Visualization Manager 300, which processes the translation from the selected data objects 14 (of the aggregated output 603) for rendering as the visual representation 18. It is recognised that the content of the representation 18 is modified to display the output 603 to the user of the tool 12, according to the aggregation parameters.

Further, the Aggregation Manager 601 provides the aggregated data objects 14 of the output 603 to a Chart Manager 604. The Chart Manager 604 compiles the data in accordance with the commands it receives from the Aggregation Manager 601 and then provides the formatted data to a Chart Output 605. The Chart Output 605 provides for storage of the aggregated data in a Chart section 606 of the display (see FIG. 25). Data from the Chart Output 605 can then be sent directly to the Visualization Renderer 112 or to the visualisation manager 300 for inclusion in the visual representation 18, as further described below.

Figure 23:
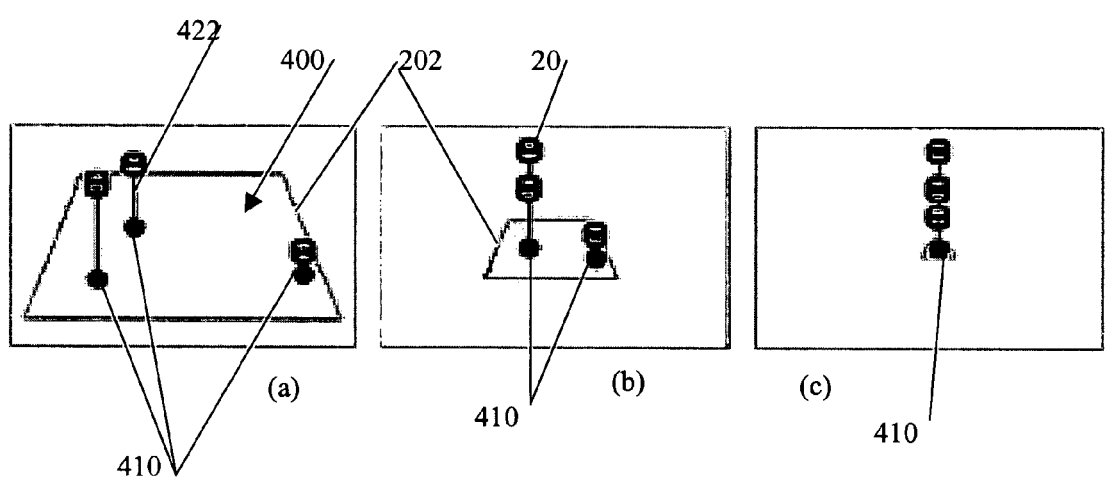
FIG. 23 shows an example aggregation result of the module of FIG. 22.

Referring to FIG. 23, an example aggregation of data objects 14 by the Aggregation Module 601 is shown. The event data 20 (for example) is aggregated according to spatial proximity (threshold) of the data objects 14 with respect to a common point (e.g. particular location 410 or other newly specified point of the spatial domain 400), difference threshold between two adjacent locations 410, or other spatial criteria as desired. For example, as depicted in FIG. 23a, the three data objects 20 at three locations 410 are aggregated to two objects 20 at one location 410 and one object at another location 410 (e.g. combination of two locations 410) as a user-defined field 202 of view is reduced in FIG. 23b, and ultimately to one location 410 with all three objects 20 in FIG. 23c. It is recognised in this example of aggregated output 603 that timelines 422 of the locations 410 are combined as dictated by the aggregation of locations 410.

For example, the user may desire to view an aggregate of data objects 14 related within a set distance of a fixed location, e.g., aggregate of events 20 occurring within 50 km of the Golden Gate Bridge. To accomplish this, the user inputs their desire to aggregate the data according to spatial proximity, by use of the controls 306, indicating the specific aggregation parameters. The Visualization Manager 300 communicates these aggregation parameters to the Aggregation Module 600, in order for filtering of the data content of the representation 18 shown on the display 108. The Aggregation Module 600 uses the Filters 602 to filter the selected data from the tables 122 based on the proximity comparison between the locations 410. In another example, a hierarchy of locations can be implemented by reference to the association data 26 which can be used to define parent-child relationships between data objects 14 related to specific locations within the representation 18. The parent-child relationships can be used to define superior and subordinate locations that determine the level of aggregation of the output 603.

Figure 24:
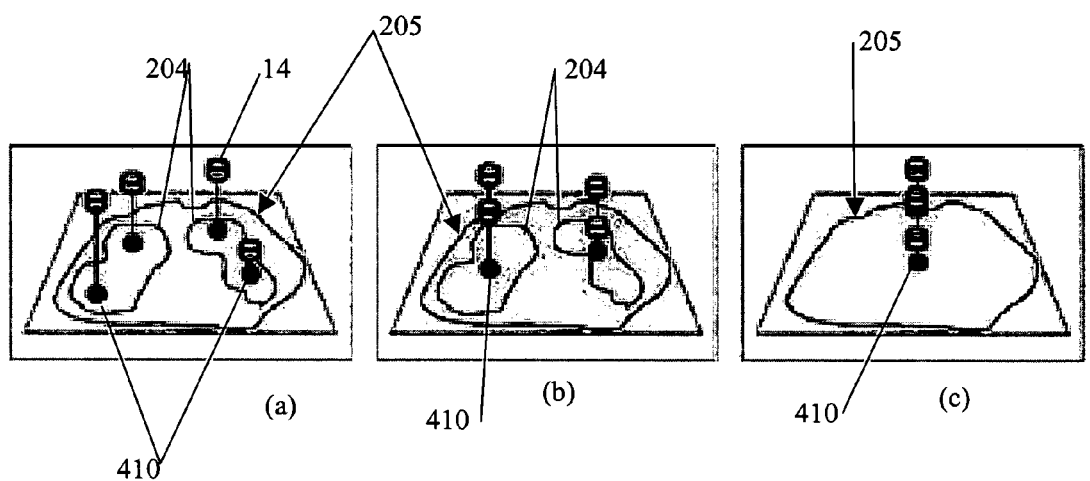
FIG. 24 is a further embodiment of the result of FIG. 23.

Referring to FIG. 24, an example aggregation of data objects 14 by the Aggregation Module 601 is shown. The data 14 is aggregated according to defined spatial boundaries 204. To accomplish this, the user inputs their desire to aggregate the data 14 according to specific spatial boundaries 204, by use of the controls 306, indicating the specific aggregation parameters of the filtering 602. For example, a user may wish to aggregate all event 20 objects located within the city limits of Toronto. The Visualization Manager 300 then requests to the Aggregation Module 600 to filter the data objects 14 of the current representation according to the aggregation parameters. The Aggregation Module 600 provides implements or otherwise applies the filters 602 to filter the data based on a comparison between the location data objects 14 and the city limits of Toronto, for generating the aggregated output 603. In FIG. 24a, within the spatial domain 205 the user has specified two regions of interest 204, each containing two locations 410 with associated data objects 14. In FIG. 24b, once filtering has been applied, the locations 410 of each region 204 have been combined such that now two locations 410 are shown with each having the aggregated result (output 603) of two data objects 14 respectively. In FIG. 24c, the user has defined the region of interest to be the entire domain 205, thereby resulting in the displayed output 603 of one location 410 with three aggregated data objects 14 (as compared to FIG. 24a). It is noted that the positioning of the aggregated location 410 is at the center of the regions of interest 204, however other positioning can be used such as but not limited to spatial averaging of two or more locations 410 or placing aggregated object data 14 at one of the retained original locations 410, or other positioning techniques as desired.

In addition to the examples in illustrated in FIGS. 21 and 22, the aggregation of the data objects can be accomplished automatically based on the geographic view scale provided in the visual representations. Aggregation can be based on level of detail (LOD) used in mapping geographical features at various scales. On a 1:25,000 map, for example, individual buildings may be shown, but a 1:500,000 map may show just a point for an entire city. The aggregation module 600 can support automatic LOD aggregation of objects 14 based on hierarchy, scale and geographic region, which can be supplied as aggregation parameters as predefined operation of the controls 306 and/or specific manual commands/criteria via user input events 109. The module 600 can also interact with the user of the tool 12 (via events 109) to adjust LOD behaviour to suit the particular analytical task at hand.

Figure 25:
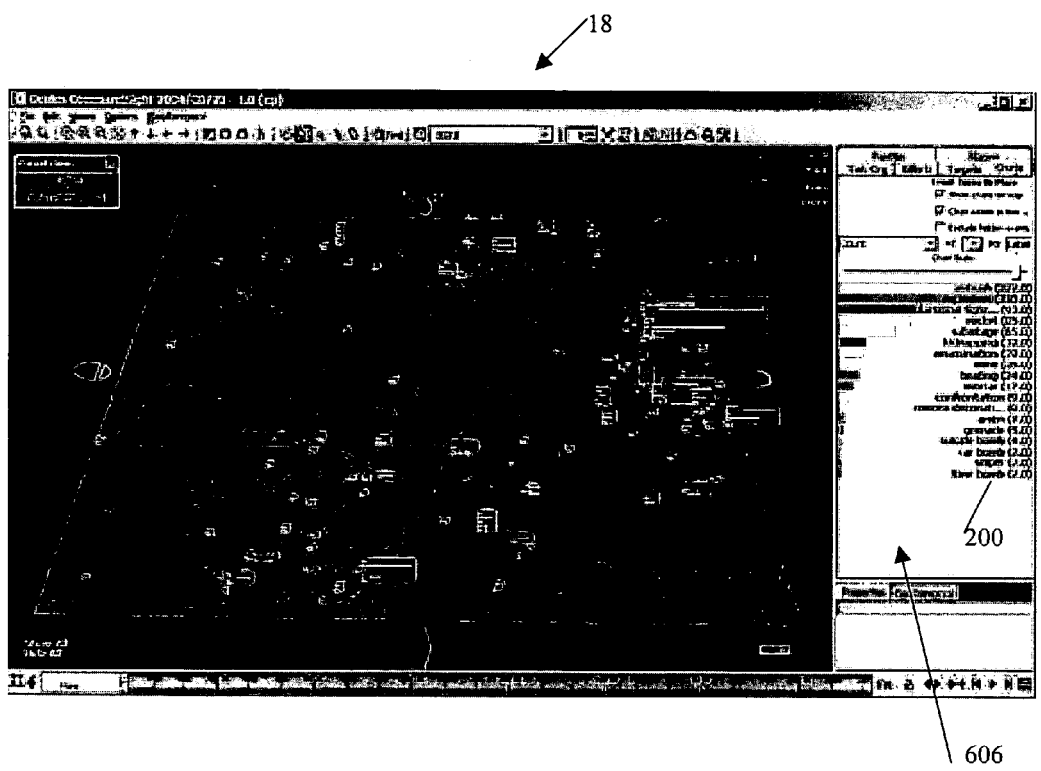
FIG. 25 shows a summary chart view of a further embodiment of the representation of FIG. 20.

Referring to FIG. 25, an example of a spatial and temporal visual representation 18 with summary chart 202 depicting event data 20 is shown. For example, a user may wish to see the quantitative information relating to a specific event object. The user would request the creation of the chart using the controls 306, which would submit the request to the Visualization Manager 300. The Visualization Manager 300 would communicate with the Aggregation Module 600 and instruct the creation of the chart 200 depicting all of the quantitative information associated with the data objects 14 associated with the specific event object 20, and represent that on the display 108 (see FIG. 2) as content of the representation 18. The Aggregation Module 600 would communicate with the Chart Manager 604, which would list the relevant data and provide only the relevant information to the Chart Output 605. The Chart Output 605 provides a copy of the relevant data for storage in the Chart Comparison Module, and the data output is communicated from the Chart Output 605 to the Visualization Renderer 112 before being included in the visual representation 18. The output data stored in the Chart Comparison section 606 can be used to compare to newly created charts 200 when requested from the user. The comparison of data occurs by selecting particular charts 200 from the chart section 606 for application as the output 603 to the Visual Representation 18.

The charts rendered by the Chart Manager 604 can be created in a number of ways. For example, all the data objects 14 from the Data Manager 114 can be provided in the chart. Or, the Chart Manager 604 can filter the data so that only the data objects 14 related to a specific temporal range will appear in the chart provided to the Visual Representation 18. Or, the Chart Manager 604 can filter the data so that only the data objects 14 related to a specific spatial and temporal range will appear in the chart provided to the Visual Representation 18.

Figure 26:
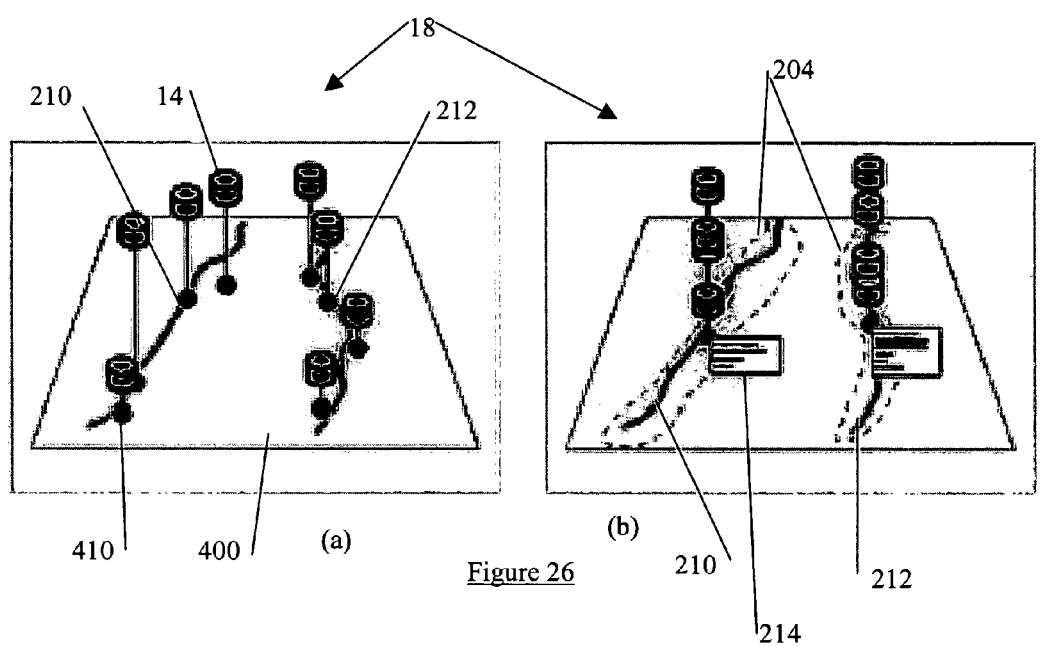
FIG. 26 shows an event comparison for the aggregation module of FIG. 23.

In a further example of the aggregation module 601, user-defined location boundaries 204 can provide for aggregation of data 14 across an arbitrary region. Referring to FIG. 26, to compare a summary of events along two separate routes 210 and 212, aggregation output 603 of the data 14 associated with each route 210,212 would be created by drawing an outline boundary 204 around each route 210,212 and then assigning the boundaries 204 to the respective locations 410 contained therein, as depicted in FIG. 26a. By the user adjusting the aggregation level in the Filters 602 through specification of the aggregation parameters of the boundaries 204 and associated locations 410, the data 14 is the aggregated as output 603 (see FIG. 26b) within the outline regions into the newly created locations 410, with the optional display of text 214 providing analysis details for those new aggregated locations 410. For example, the text 214 could summarise that the number of bad events 20 (e.g. bombings) is greater for route 210 than route 212 and therefore route 212 would be the route of choice based on the aggregated output 603 displayed on the representation 18.

It will be appreciated that variations of some elements are possible to adapt the invention for specific conditions or functions. The concepts of the present invention can be further extended to a variety of other applications that are clearly within the scope of this invention.

For example, one application of the tool 12 is in criminal analysis by the "information producer". An investigator, such as a police officer, could use the tool 12 to review an interactive log of events 20 gathered during the course of long-term investigations. Existing reports and query results can be combined with user input data 109, assertions and hypotheses, for example using the annotations 21. The investigator can replay events 20 and understand relationships between multiple suspects, movements and the events 20. Patterns of travel, communications and other types of events 20 can be analysed through viewing of the representation 18 of the data in the tables 122 to reveal such as but not limited to repetition, regularity, and bursts or pauses in activity.

Subjective evaluations and operator trials with four subject matter experts have been conducted using the tool 12. These initial evaluations of the tool 12 were run against databases of simulated battlefield events and analyst training scenarios, with many hundreds of events 20. These informal evaluations show that the following types of information can be revealed and summarised. What significant events happened in this area in the last X days? Who was involved? What is the history of this person? How are they connected with other people? Where are the activity hot spots? Has this type of event occurred here or elsewhere in the last Y period of time?

With respect to potential applications and the utility of the tool 12, encouraging and positive remarks were provided by military subject matter experts in stability and support operations. A number of those remarks are provided here. Preparation for patrolling involved researching issues including who, where and what. The history of local belligerent commanders and incidents. Tracking and being aware of history, for example, a ceasefire was organized around a religious calendar event. The event presented an opportunity and knowing about the event made it possible. In one campaign, the head of civil affairs had been there twenty months and had detailed appreciation of the history and relationships. Keeping track of trends. What happened here? What keeps happening here? There are patterns. Belligerents keep trying the same thing with new rotations [a rotation is typically six to twelve months tour of duty]. When the attack came, it did come from the area where many previous earlier attacks had also originated. The discovery of emergent trends . . . persistent patterns . . . sooner rather than later could be useful. For example, the XXX Colonel that tends to show up in an area the day before something happens. For every rotation a valuable knowledge base can be created, and for every rotation, this knowledge base can be retained using the tool 12 to make the knowledge base a valuable historical record. The historical record can include events, factions, populations, culture, etc.

Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

We claim:

1. A method for creating a multidimensional visual representation of a group of data elements having integrated temporal and spatial properties, the data elements being included in the visual representation as a corresponding plurality of visual elements, at least two of the data elements of the group linked by at least one association, the method comprising the steps of:

generating a spatial domain of the visual representation to include a reference surface for providing a spatial reference frame having at least two spatial dimensions, the reference surface for relating a first visual element of the plurality of visual elements representing a first data element of the group to a first location of interest in the spatial reference frame and relating a second visual element of the plurality of visual elements representing a second data element of the group to a second location of interest in the spatial reference frame, the first and second data elements being defined as positioned with respect to their respective location of interest for time defined in a temporal reference frame;

generating a temporal domain of the visual representation operatively coupled to the spatial domain, the temporal domain for providing the common temporal reference frame for the locations of interest, the temporal domain including a first time track coupled to the first location of interest and a second time track coupled to the second location of interest, the first visual element positioned on the first time track and the second visual element positioned on the second time track, each of the time tracks configured for visually representing a respective temporal sequence of a plurality of the data elements at each of the locations of interest;

linking the first data element to the second data element using the at least one association, the at least one association configured for representing a connection between the first data element and the second data element, the connection having at least one property in the spatial domain and including time as a temporal property;

assigning a connection visual element in the visual representation between the first visual element and the second visual element, the connection visual element for representing the at least one association; and aggregating the first data element and the second data element into an aggregated element group according to a selected aggregation parameter, the aggregated element group configured for reducing the visual complexity of the visual elements for display in the visual representation by displaying the aggregated element group on a third time track and removing the display of the first and second time tracks from the visual representation wherein the visual representation is configured for display on a user interface for subsequent interaction with user events wherein the user interface uses a processor and a memory.

2. The method of claim 1, wherein the visual representation of the group of data elements is selected from the group comprising; a concurrent time and geographic context and a concurrent time and diagrammatic context.

3. The method of claim 2, wherein the diagrammatic context includes a plurality of nodes of a defined process, such that one of the nodes is positioned at the first location of interest and a second one of the nodes is positioned at the second location of interest.

4. The method of claim 2 further comprising the step of arranging the plurality of the visual elements along the time tracks according to the times at which the corresponding data elements occurred in the temporal reference frame, the type of the data elements selected from the group comprising: entitles; events; locations; and associations.

5. The method of claim 2, wherein the location in the temporal reference frame of each of the plurality of visual elements on the time tracks is proportional to the distance from the locations of interest associated with the reference surface, the type of the visual elements selected from the group comprising: entitles; events; locations; and associations.

6. The method of claim 5, wherein the time tracks are represented as timelines in the visual representation.

7. The method of claim 2, wherein types of the data elements are selected from the group comprising; entity, location, association, and event.

8. The method of claim 7, wherein the event data element type represents an action taking place at a particular one of the locations of interest in the spatial reference frame and at a particular time in the temporal reference frame.

9. The method of claim 8, wherein the event data element type has data properties and display properties selected from the group comprising; a short text label, description, location, start-time, end-time, general event type, icon reference, visual layer settings, priority, status, user comment, certainty value, source of information, default and user-set color, reference document, and reference photograph.

10. The method of claim 7, wherein the entity data element type represents an actor involved in a selected event.

11. The method of claim 10, wherein the entity data element type has data properties and display properties selected from the group comprising; short text label, description, general entity type, icon reference, visual layer settings, priority, status, user comment, certainty value, source of information, default and user-set color, and reference document, and reference photograph.

12. The method of claim 7, wherein the location data element type represents a location within the spatial reference frame.

13. The method of claim 12, wherein the location data element type has data properties and display properties selected from the group comprising; position coordinates, a label, description, color information, precision information, location type, non-geospatial flag and user comments, reference document, and reference photograph.

14. The method of claim 13, wherein the location data element type is selected from the group comprising; a physical location on a geospatial map, a physical location as a node in a diagram, and a virtual location related to a geospatial map such that the virtual location is not assigned to a specific physical location on the geospatial map.

15. The method of claim 2, wherein the at least one association describes a pairing between two or more of the data elements for providing an information data object related to both of the two or more data elements.

16. The method of claim 15 wherein the connection visual element for the at least one association is a selected line.

17. The method of claim 15 wherein the information data object is selected from the group comprising: a communication connection describing communication details transferred between the two or more data elements; a financial transaction or other transaction; and a relationship connection describing social details in common between the two or more data elements.

18. The method of claim 17, wherein the information data object is selected from the group comprising: a direct connection; and an indirect connection.

19. The method of claim 15, wherein the at least one association is predefined or is created due to user interaction with the visualization representation.

20. The method of claim 19, wherein the user interaction generates user events for modifying visual properties of the connection visual element 21. The method of claim 20 further comprising the step of applying a filtering function to the visual elements and the at least one related association to select a subgroup thereof, selection of the subgroup according to a method selected from the group comprising; criteria matching, algorithmic methods, and manual selection.

22. A computer implemented system for creating a multidimensional visual representation of a group of data elements having integrated temporal and spatial properties, the data elements being included in the visual representation as a corresponding plurality of visual elements, at least two of the data elements of the group linked by at least one association, the system comprising:

a processor and a memory;

a spatial visualization component configured for generating a spatial domain of the visual representation to include a reference surface for providing a spatial reference frame having at least two spatial dimensions, the reference surface for relating a first visual element of the plurality of visual elements representing a first data element of the group to a first location of interest in the spatial reference frame and relating a second visual element of the plurality of visual elements representing a second data element of the group to a second location of interest in the spatial reference frame, the first and second data elements being defined as positioned with respect to their respective location of interest for time defined in a temporal reference frame;

a temporal visualization component configured for generating a temporal domain of the visual representation operatively coupled to the spatial domain, the temporal domain for providing the common temporal reference frame for the locations of interest, the temporal domain including a first time track coupled to the first location of interest and a second time track coupled to the second location of interest, the first visual element positioned on the first time track and the second visual element positioned on the second time track, each of the time trades configured for visually representing a respective temporal sequence of a plurality of the data elements at each of the locations of interest;

a visualization manager for linking the first data element to the second data element using the at least one association and for assigning a corresponding connection visual element in the visual representation between the first visual element and the second visual element, the at least one association configured for representing a connection between the first data element and the second data element and having at least one property in the spatial domain and including time as a temporal property; and an aggregation manager configured for aggregating the first data element and the second data element into an aggregated element group according to a selected aggregation parameter, the aggregated element group configured for reducing the visual complexity of the visual elements for display in the visual representation, the aggregated element group being displayed on a third time track and the display of the first and second time tracks being removed from the visual representation;

wherein the visual representation is displayed on a user interface for subsequent interaction with user events.

23. The method of claim 4 wherein the first and second data elements represent entitles connected to the same event by the at least one association.

24. The method of claim 16, wherein the line type further includes a vector property for representing a quantity selected from the group comprising: a direction of movement; polarity; and a sequence.

25. The method of claim 2 further comprising the step of dynamically adding an annotation to the visual representation by the user, the annotation selected from the group comprising a geometrical object and a text abject, the annotation having at least one property in the spatial domain and at least one property in the temporal domain.

26. The method of claim 25 further comprising the step of dynamically changing a visual property of the annotation based on a selected range in the spatial domain.

27. The method of claim 25 further comprising the step of dynamically changing a visual property of the annotation based on a selected range in the temporal domain.

28. The method of claim 25 wherein the geometrical object is selected from the group comprising: a line; and a closed shape.

29. The method according to claim 1, wherein the aggregation parameter is selected from the group comprising: a time range in the temporal reference frame; a spatial range in the spatial reference frame; a location of interest; a combination of locations of interest; a hierarchy of locations of interest; an event; a combination of events; an entity; a combination of entities; a level of detail for the visual complexity according to a scale of the visual representation; an association; and a combination of associations.

30. The method according to claim 29, wherein the method of selection of the aggregation parameter is selected from the group comprising: predefined; and dynamically specified by a user.

31. The method according to claim 29 further comprising the step of selecting the combination of locations according to a selected region in the spatial reference frame.

32. The method according to claim 31 wherein the selected region is selected from the group comprising: a point; and a set of points.

33. The method according to claim 1 further comprising the step of locating the third time track at a different location of interest calculated as a combination of the positions of the first and second locations of interest.

34. The method according to claim 1, wherein both the first data element and the third data element are selected from the first time track.

35. The method according to claim 34, wherein the method of selection of the aggregation parameter is selected from the group comprising: predefined; and dynamically specified by a user.

36. The method according to claim 1 further comprising the step of attaching a label to the aggregated element group displayed in the visual representation.

37. The method according to claim 1, wherein the aggregation parameter is specified using a predefined filter.

38. The method according to claim 1 further comprising the step of indicating that the aggregated element group is a result of aggregation of multiple events.

39. The method according to claim 37, wherein the predefined filter is selected from the group comprising: a specified degree of separation between the first and third data elements; a specified spatial boundary including the locations of interest of the first and third data elements; a specified spatial proximity to the locations of interest of the first and third data elements; a specified hierarchy indicating a parent-child relationship between the first and third data elements; and at least one specified association between the first and third data elements.

40. The method of claim 16, wherein the selected line type is different for each association type.

41. The system of claim 22 wherein the visual representation of the group of data elements is selected from the group comprising; a concurrent time and geographic context and a concurrent time and diagrammatic context.

42. The system of claim 41, wherein the diagrammatic context includes a plurality of nodes of a defined process, such that one of the nodes is positioned at the first location of interest and a second one of the nodes is positioned at the second location of interest.

43. The system of claim 41 wherein types of the data elements are selected from the group comprising; entity, location, association, and event.

44. The system of claim 41, wherein the at least one association describes a pairing between two or more of the data elements for providing an information data object related to both of the two or more data elements.

45. The system of claim 44, wherein the connection visual element for the at least one association is a selected line type.

46. The system of claim 44, wherein the information data object is selected from the group comprising: a communication connection describing communication details transferred between the two or more data elements; a financial transaction or other transaction; and a relationship connection describing social details in common between the two or more data elements.

47. The system of claim 46, wherein the information data object is selected from the group comprising: a direct connection; and an indirect connection.

48. The system of claim 44, wherein the at least one association is predefined or is created due to user interaction with the visualization representation.

49. The system of claim 48 wherein the user interaction generates user events for modifying visual properties of the connection visual element.

50. The system of claim 22, wherein the first and second data elements represent entitles connected to the same event by the at least one association.

51. The system of claim 22, further comprising a user interface configured for dynamically adding an annotation to the visual representation by the user, the annotation selected from the group comprising a geometrical object and a text object, the annotation having at least one property in the spatial domain and at least one property in the temporal domain.

52. The system of claim 51, wherein the geometrical object is selected from the group comprising: a line; and a closed shape.

53. The system according to claim 22, wherein the aggregation parameter is selected from the group comprising: a time range in the temporal reference frame; a spatial range in the spatial reference frame; a location of interest; a combination of locations of interest; a hierarchy of locations of interest; an event; a combination of events; an entity; a combination of entities; a level of detail for the visual complexity according to a scale of the visual representation; an association; and a combination of associations.

54. The system according to claim 53, wherein the aggregation parameter is selected from the group comprising: predefined; and dynamically specified by a user.

55. The system according to claim 53 further comprising the aggregation manager configured for selecting the combination of locations according to a selected region in the spatial reference frame.

56. The system according to claim 55, wherein the selected region is selected from the group comprising: a point; and a set of points.

57. The system according to claim 22 further comprising the aggregation manager configured for locating the third time track at a different location of interest calculated as a combination of the positions of the first and second locations of interest.

58. The system according to claim 22, wherein both the first data element and the third data element are selected from the first time track.

59. The system according to clam 58, wherein the aggregation parameter is selected from the group comprising: predefined; and dynamically specified by a user.

60. The system according to claim 22 further comprising the aggregation manager configured for attaching a label to the aggregated element group displayed in the visual representation.

61. The system according to claim 22 further comprising a predefined filter for specifying the aggregation parameter.

62. The system according to claim 22 further comprising the aggregation manager configured for indicating that the aggregated element group is a result of aggregation of multiple events.

63. The system according to claim 61, wherein the predefined filter is selected from the group comprising: a specified degree of separation between the first and third data elements; a specified spatial boundary including the locations of interest of the first and third data elements; a specified spatial proximity to the locations of interest of the first and third data elements; a specified hierarchy indicating a parent-child relationship between the first and third data elements; and at least one specified association between the first and third data elements.

64. The method of claim 1, wherein the first data element is further defined as having a first time span in the temporal reference frame.

* * * * *